(12) United States Patent
Garmany

(10) Patent No.: US 9,008,216 B2
(45) Date of Patent: *Apr. 14, 2015

(54) LOW-AMPLITUDE ECHO ESTIMATION FOR A RECEIVED COMMUNICATION SIGNAL

(71) Applicant: Coherent Logix, Incorporated, Austin, TX (US)

(72) Inventor: Jan D. Garmany, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,956

(22) Filed: Jan. 9, 2014

(65) Prior Publication Data

US 2014/0126624 A1     May 8, 2014

Related U.S. Application Data

(63) Continuation of application No. 13/860,090, filed on Apr. 10, 2013, now Pat. No. 8,654,827, which is a continuation of application No. 12/885,179, filed on Sep. 17, 2010, now Pat. No. 8,451,933, which is a (Continued)

(51) Int. Cl.
*H04L 25/34*     (2006.01)
*H04B 3/23*     (2006.01)
*H04L 25/02*     (2006.01)
*H04L 25/03*     (2006.01)

(Continued)

(52) U.S. Cl.
CPC .............. *H04B 3/235* (2013.01); *H04L 25/022* (2013.01); *H04L 25/0228* (2013.01);

(Continued)

(58) Field of Classification Search
IPC ............... H04L 1/20,7/042, 25/4917, 25/03038
See application file for complete search history.

(56) References Cited

U.S. PATENT DOCUMENTS 4,823,382 A    4/1989   Martinez
5,117,418 A    5/1992   Chaffee et al.

(Continued)

FOREIGN PATENT DOCUMENTS

EP      0975124     1/2000
WO    00/64114    10/2000

OTHER PUBLICATIONS

G.A. Clark, S.K. Mitra, S.R. Parker, "Block Implementation of Adaptive Digital Filters," IEEE Trans. ASSP, pp. 744-752, vol. 29, Jun. 1981.

(Continued)

*Primary Examiner* — Leon-Viet Nguyen
(74) *Attorney, Agent, or Firm* — Meyertons Hood Kivlin Kowert & Goetzel, P.C.; Jeffrey C. Hood

(57) ABSTRACT

A system and method for identifying minor echoes present in an input signal in the situation where a set of major echoes has already been identified from the input signal. The method includes: computing a spectrum F corresponding to a sum of the major echoes; computing a weighted power spectrum $S_M$ of the spectrum F; subtracting the weighted power spectrum $S_M$ from a weighted power spectrum $P_{IN}$ of the input signal to obtain a difference spectrum; performing a stabilized division of the difference spectrum by a conjugate of the spectrum F to obtain an intermediate spectrum; computing an inverse transform of the intermediate spectrum to obtain a time-domain signal; and estimating parameters one or more of the minor echoes from the time-domain signal. The echo parameters are usable to remove at least a portion of the one or more estimated minor echoes from the input signal.

20 Claims, 13 Drawing Sheets

Related U.S. Application Data continuation-in-part of application No. 12/015,274, filed on Jan. 16, 2008, now Pat. No. 7,801,242, which is a continuation of application No. 10/621,293, filed on Jul. 17, 2003, now Pat. No. 7,346,013.

(60) Provisional application No. 60/396,819, filed on Jul. 18, 2002.

(51) Int. Cl.
*H04L 27/06* (2006.01)
*H04B 3/46* (2006.01)
*H04L 27/26* (2006.01)

(52) U.S. Cl.
CPC ......... *H04L 25/03159* (2013.01); *H04L 27/06* (2013.01); *H04L 25/03828* (2013.01); *H04B 3/468* (2013.01); *H04L 27/2613* (2013.01); *H04L 27/2662* (2013.01); *H04L 27/2695* (2013.01); *H04L 2025/03414* (2013.01)

(56) References Cited

U.S. PATENT DOCUMENTS

| | | |
|---|---|---|
| 5,172,232 A | 12/1992 | Koo |
| 5,648,987 A | 7/1997 | Yang et al. |
| 5,809,069 A | 9/1998 | Polley et al. |
| 6,768,517 B2 | 7/2004 | Limberg et al. |
| 8,451,933 B2 * | 5/2013 | Garmany ............ 375/286 |
| 8,654,827 B2 * | 2/2014 | Garmany ............ 375/224 |
| 2002/0191779 A1 | 12/2002 | Pham |
| 2003/0112882 A1 | 6/2003 | Sampath |
| 2004/0030859 A1 | 2/2004 | Doerr et al. |

OTHER PUBLICATIONS

G.A. Clark, S.K. Mitra, S.R. Parker, "Block Implementation of Adaptive Digital Filters," IEEE Trans. CAS, pp. 584-592, vol. 6, Jun. 1981.

J.C. Lee and C.K. Un, "Performance Analysis of Frequency-Domain Block LMS Adaptive Digital Filters," IEEE Trans. on Circuits and Systems, pp. 173-189, vol. 36, No. 2, Feb. 1989.

Monisha Ghosh, "Blind Decision Feedback Equalization for Terrestrial Television Receivers," Proceedings of the IEEE, pp. 2070-2081, vol. 86, No. 10, Oct. 1998.

Advanced Television Systems Committee, "ATSC Standard: Digital Television Standard, Revision B with Amendments 1 and 2," Document A/53B, Aug. 7, 2001; Amendment 1, May 23, 2002; Amendment 2, May 19, 2003.

* cited by examiner

LOW-AMPLITUDE ECHO ESTIMATION FOR A RECEIVED COMMUNICATION SIGNAL

PRIORITY CLAIM DATA

This application is a continuation of U.S. patent application Ser. No. 13/860,090, filed on Apr. 10, 2013, titled "Estimation of Low-Amplitude Echoes in a Received Communication Signal", invented by Jan D. Garmany, which is a continuation of U.S. patent application Ser. No. 12/885,179, filed on Sep. 17, 2010, titled "Detection of Low-Amplitude Echoes in a Received Communication Signal", invented by Jan D. Garmany, which is a continuation-in-part of U.S. patent application Ser. No. 12/015,274 (now U.S. Pat. No. 7,801,242), filed on Jan. 16, 2008, titled "Frequency Domain Equalization of Communication Signals", invented by Jan D. Garmany and William H. Hallidy, Jr., which is a continuation of U.S. patent application Ser. No. 10/621,293 (now U.S. Pat. No. 7,346,013), filed on Jul. 17, 2003, titled "Frequency Domain Equalization of Communications Signals", invented by Jan D. Garmany and William H. Hallidy, Jr., which claims the benefit of priority of U.S. Provisional Application No. 60/396,819, filed on Jul. 18, 2002, titled "Frequency Domain Equalization Algorithm", invented by Jan D. Garmany and William H. Hallidy, Jr. All of the above-identified applications are hereby incorporated by reference in their entirety as though fully and completely set forth herein.

FIELD OF THE INVENTION

The present invention relates generally to the field digital telecommunication, and more particularly, to an equalization method for eliminating echoes from a received signal that has been captured from a communication channel.

DESCRIPTION OF THE RELATED ART

Many systems utilize wireless transmission of signals, including wireless telephone systems, wireless television systems, and other systems which perform wireless communication. Such systems generally include at least one transmitter which transmits signals through a channel to at least one receiver. During transmission of the signals through the channel, multiple reflections and diffraction from natural and/or man-made obstacles can occur. Such obstacles can include buildings, homes, vehicles, or natural terrain such as mountains or trees. The reflections and diffraction from these objects creates multipath distortion of the transmitted signal. In open wireless channels, multipath reflections can introduce inter-symbol interference ISI into the received signal. In certain wired transmission systems, multipath reflections can also occur, e.g., micro-reflections due to impedance mismatch from various passive or active elements in the channel, such as taps, amplifiers, and cables, etc. Thus, there exists a need for systems and methods capable of performing equalization, i.e., compensating for the multipath distortion present in a received signal.

An equalizer is an electrical circuit positioned after signal down-conversion and before error-correction. The equalizer processes a signal to remove distortions introduced by the channel, for example, echoes/ghosts introduced by multiple paths in a radio/television channel. The signal output of the equalizer is "better" the more closely it approximates the signal input to the transmitter. Signals can be analog or digital. Digital signals may have many possible levels of amplitude/phases. Unique combinations of amplitude/phase are called symbols, and a digital signal may be represented as a symbol stream. For example, the North American High Definition Television (HDTV) Standard utilizes 8 amplitude levels with a DC offset. The transmitter produces one sideband with 8 amplitude levels and a vestigial carrier (8-VSB).

The equalizer in a radio/TV receiver is designed to compensate for distortions of the signal introduced by the channel. Typical distortions in a TV channel come from reflections from buildings and aircraft. Also, persons moving near an antenna can alter the relative strengths of individual reflection paths striking an antenna. Thus there is a need to compensate for echo ensembles which may be static or a mix of static and dynamic paths. For HDTV the symbol period is about 0.093 μsec and the echoes to be compensated can be up to 60 μsec away. Thus there can be a high degree of inter-symbol interference (ISI), up to 645 symbol periods away. Moving reflectors introduce Doppler shifts. The channel may also introduce noise into the signal, where the noise may be white or impulsive (bursting). For digital signals, noise can cause decision circuits to make symbol errors. The processing after the equalizer is designed to remove symbol errors through the use of trellis decoding, de-interleaving, and error correction (Reed-Solomon decoder in FIG. 2). Randomizing a signal breaks up long strings of a single symbol, which neutralizes the effect of long strings of DC offsets in AC-coupled circuits. For HDTV, the symbol error rate at the input to the trellis decoder can be up to about 20% before the error correction processing breaks down.

Typically, an equalizer is a filter with a characteristic response of its outputs to its inputs. The filter characteristic may be altered to compensate for specific distortions introduced by a specific channel. Ideally, the equalizer response compensates for all the distortions introduced by the channel. However, the more complex the distortions, the more complex the compensation required, ultimately requiring a larger equalizer circuit. For static distortions, the measure of compensation quality is the mean square error (MSE) across a long string of random symbols, plus any noise introduced by the equalizer as it fluctuates about the converged characteristic. For dynamic distortions the measure of quality includes a tracking component, such as the rate of convergence, or the allowable Doppler shift.

Various filter architectures have been used or proposed for digital signal equalizers. Filter architectures may be described by the features included in the signal data path and by the features in the control algorithm. The data path input and output are symbol streams in the time domain. Conventional digital filters keep the data in sequence in the time domain without explicit reference to frequency. However, the input symbol stream may be transformed to the frequency domain by means of a discrete Fourier transform (DFT), altered in the frequency domain, and then returned to the time domain by means of an inverse discrete Fourier transform (IDFT).

Frequency domain filters have been proposed for use in modems to receive high-bit rate data across digital subscriber lines (DSL) made of twisted pair cable, see Polley et al. U.S. Pat. No. 5,809,069. In DSL modem applications, the symbol rate is allowed to vary depending on line quality, however the maximum symbol rate is limited by the receiver's analog sampling rate, currently at about 2.2 M samples per second. Two-way cross talk and multiple echoes are the main distortions for DSL, with Doppler shifts non-existent. Since the DSL cable does not change very often, a complex training sequence may be used to determine equalizer characteristics, and then no further update is needed, perhaps for many days. These are very different requirements than for radio/television channels. Thus equalizers designed for DSL generally would not work for radio/television, especially for HDTV where the symbol rate is higher, about 10.8 M symbols per sec, and the channel fluctuates sometimes up to tens of Hertz.

Frequency domain digital equalizers have not been proposed for HDTV or other high-symbol-rate broadcast links. One reason is that frequency domain digital equalizers have a higher computational complexity, which in the past would have produced excessive receiver cost. Thus control algorithms for frequency-domain HDTV equalizers are in a state of infancy compared to the prior art for time-domain equalizers. Many of the features used or proposed for HDTV time-domain equalizers may be applicable to frequency domain equalizers, but may not be necessary or desired. A brief summary of time domain equalizers follows, with a focus on their reported limitations.

Most digital filters are of the type Finite Impulse Response (FIR) or infinite impulse response (IIR). A FIR filter can be constructed of a tapped delay line and a summation node where each input to the summation is a tap signal multiplied by an independent coefficient (or "weight") for that tap. The more taps in the filter, the more capable it is to compensate for longer echo delays. An IIR filter can be formed by the combination of a component FIR filter and a digital adder. The adder sums the inputs to the IIR with the outputs of its component FIR filter and supplies IIR outputs, which outputs are also fed back to the input of the component FIR filter. Because of the feedback, IIR filters can cancel longer delayed echoes better than FIR filters, however, their stability is not assured.

The characteristics of a transmitted digital signal are generally known a priori. Therefore, at least in theory, it is possible to utilize such characteristics in a system of multipath detection and adaptive channel equalization. However, this approach to channel equalization has various problems. Accordingly, some signal communication standards utilize a training signal for the detection and characterization of multipath distortion. For example, television signal transmission systems recurrently transmit a training signal situated in a portion of the TV signal that is currently unused for video purposes, and this training signal is used for the detection and characterization of multipath distortion. Here it is presumed that the transmitted training signal will suffer the same multipath distortions as the rest of the television signal. The receiver can then examine the distorted training signal that is received and, with a priori knowledge of the distortion-free training signal, can calculate the characteristics of the transmission channel. The receiver can then calculate the characteristics required of a filter that will respond to the received signal, but will suppress the effects of multipath signals. A variety of different types of training or "ghost cancellation reference" signals have been described in patents and other technical publications.

The following is a quote from U.S. Pat. No. 5,648,987 to Yang, et al., issued Jul. 15, 1997, pp. 18-19, columns 2-3:

"In the digital television signals for broadcasting high-definition television (HDTV), each data field contains 313 data lines, and the fields are consecutively numbered modulo-two in order of their occurrence. Each line of data starts with a line synchronization code group of four symbols having successive values of +S, −S, −S and +S. The value +S is one level below the maximum positive data excursion, and the value −S is one level above the maximum negative data excursion. The lines of data are each of 77.3 microsecond duration, and there are 832 symbols per data line for a symbol rate of about 10 [megasymbols/second]. The initial line of each data field is a field synchronization code group that codes a training signal for channel-equalization and multipath signal suppression procedures. The training signal is a 511-sample pseudo-random sequence (or "PR-sequence") followed by three 63-sample PR sequences. This training signal is transmitted in accordance with a first logic convention in the first line of each odd-numbered data field and in accordance with a second logic convention in the first line of each even-numbered data field, the first and second logic conventions being one's complementary respective to each other. The reference sequence(s) can be analyzed, channel characterization determined and appropriate equalizing filter can be implemented. However, this process can be rather slow and is definitely not suitable for any multipath signal, such as some airplane flutter, that varies quite quickly with elapsed time."

"Owing to the nature of the digital signal used in HDTV, the adaptation of the channel-equalization filter could be performed with every received symbol on a decision-directed basis (in the absence of the reference sequence). However, currently the limiting factor on the speed of initially equalizing the reception channel or of tracking a time-varying multipath is established by the processing speeds of the computing devices being utilized. Increasing the processing speeds of the computing devices will improve system performance until the point is reached at which all the computations and the subsequent updating of the filter coefficients can be realized with each newly received symbol or with a reasonably small group of newly received symbols."

"Several methods of performing 'adaptive equalization/multipath cancellation' are described in the literature. In simplest terms, the input signal is processed through an equalizer filter. The filter output, is 'compared' to the desired output and based on a certain algorithm a correction to the filter parameters is computed and adapted to the filter. The process is continuously repeated until the equalized filter output is 'correct', so multipath effects are attenuated sufficiently that they do not exceed levels prescribed as being "acceptable". To aid in developing an understanding of the nature of the computations involved, the reader is referred to the following publications, incorporated by reference: G. A. Clark, S. K. Mitra, S. R. Parker, Block implementation of adaptive digital filters, IEEE Trans. ASSP, pp. 744-752, Vol. 29, June 1981; and J. C. Lee and C. K. Un, Performance Analysis of Frequency-Domain Block LMS Adaptive Digital Filters, IEEE Trans. on Circuits and Systems, pp. 173-189, Vol. 36, No. 2, February 1989."

"The basic adaptive equalization/multipath cancellation equations are known from the last-listed of these references to be:

$$y^n = \sum_{k=0}^{N-1} W_k^m \cdot X^{(n-k)}, \quad (1)$$

$$k = 0, 1, \ldots, (N-1), \text{ and } mN \leq n < (m+1)N$$

$$e^n = y^n - d^n \quad (2)$$

$$\Delta_k^m = \sum_{j=mN}^{[(m+1)N]-1} e^j \cdot X^{(j-k)} \quad (3)$$

$$W_k^{(m+1)} = W_k^m + \mu \cdot \Delta_k^m." \quad (4)$$

"This adaptation algorithm is based on a group of N symbols and not on each symbol. Such an algorithm is identified as 'Block LMS'. It is known to have the same performance as the well-known LMS (least mean squares) algorithm when the channel varying speed is slower than the realized convergence with the block of N symbols. (Superscripted terms in these equations are not terms raised to 'powers' indicated by the superscript. Rather the superscripts following general terms are a set of further indices for sets of specific terms, the specific terms in each set being indexed by subscripts following general terms.) A channel-equalization filter with coefficients $W_k$ (the parameter m is not shown here since it only indicates the number of updates) and input data $X''$ (ghosted and/or equalization needed) generates equalized data $y''$ according to equation (1). Since the equalization indicated by equation (1) must be done in real-time, standard practice is to implement that equalization using an appropriate FIR filter. When equalization is done using a training signal, an IIR filter suppresses multipath responses that are delayed respective to strongest signal better than an FIR filter having the same number of taps. In decision-directed equalization, the computation of weighting coefficients for the channel-equalization filter is based strictly on some observation that does not depend on or indicate the time relationship of multipath signals. When the computation procedure begins without knowledge of suitable initial values of the weighting coefficients, the procedure is referred to as 'blind' equalization. Because the response of an IIR filter is regenerative in nature, errors introduced by 'blind' equalization tend to be perpetuated and will be rarely eliminated by continuing calculation. Presumably this is the reason that, until the invention [U.S. Pat. No. 5,648,987] was made, decision-directed equalization had invariably been used only with FIR channel-equalization filters."

As described in U.S. Pat. No. 5,648,987 to Yang et al., equalization filters are known which cascade a finite-impulse-response (FIR) filter with an infinite-impulse-response (IIR) filter. The IIR filter can be formed from a digital adder with a component FIR filter. The coefficients of the component FIR filter in the IIR filter can be initially adjusted in response to information obtained from the training signals contained in portions of the transmitted data. This initial adjustment of the coefficients of the component FIR filter is performed to avoid the instability problems normally associated with IIR filters. Thereafter, Yang teaches that the coefficients of the component FIR filter can be computed as described in Yang using a further FIR filter to implement decision directed techniques in which best estimates of correct filter response are formed by quantizing actual filter response. Yang further teaches that, in equalization filters which cascade a finite-impulse-response (FIR) filter with the infinite-impulse-response (IIR) filter, the coefficients of the filters are independently adjusted.

The history of time-domain equalizers for North American HDTV is surveyed by M. Ghosh [1], who shows that the 8-VSB modulation was selected in part because of more effective equalization than competitive schemes. "The equalizer in the prototype built by Zenith was a DFE [Decision Feedback Equalizer] with 64 forward and 192 feedback taps [for the two digital filters] and was adapted using the standard LMS algorithm on the pseudo random noise (PN) sequence in the field sync segment. Since the field-sync segment arrives only once every field (i.e, about once every 24 ms), the overall rate of convergence of the equalizer can be quite slow." However, after convergence on a static echo pattern, the mean square error (MSE) was fairly good, and this helped 8-VSB to win the Grand Alliance recommendation. Testing on dynamic echoes was very limited at the time. HDTV manufacturers are free however to use any equalizer they like as long as it meets performance goals.

The summary from M. Ghosh in 1998 [1]:

" . . . the need for tracking time-varying channels indicates the use of blind algorithms. In this paper the advantages of a blind DFE structure were presented via the ATTC [Advanced Television Test Center] test results, as well as simulations with the Godard blind equalization algorithm. The advantages of using a blind DFE have since been validated by numerous field tests that have been conducted by HDTV receiver manufacturers. In addition to the advantages of the blind DFE in long multipath and dynamic multipath, a blind algorithm enables faster acquisition as well. With trained-only equalization it may take the equalizer 10-15 data fields to converge since the field sync occurs only once in each field. However, with blind equalization the equalizer converges in less than one field in most cases."

"One of the main concerns in implementing an equalizer for digital television receivers is the number of taps required, which is on the order of 256. Hence, simple equalization algorithms can greatly reduce the hardware required to implement such a long equalizer. Future work in this area needs to concentrate on developing hardware efficient blind algorithms. The Godard algorithm and the RCA [Reduced Constellation Algorithm] both require multipliers in each of the tap update steps, which can add up to a large area requirement in silicon. Recent work in this area [1 [20]-[22]] has concentrated on sign-error versions of the Godard cost function, which does away with the need for multiplications in the tap update step and reduces implementation complexity. Faster algorithms with low complexity are also an area in need of further research, since the Godard algorithm can be quite slow in tracking rapidly varying channels."

"Finally, while the literature on the analyses of blind algorithms for linear equalizers is very rich, the same is not true for blind algorithms for DFE's with significant error propagation. HDTV receivers happen to be a very important commercial application for such structures, and there is a need for more analytical results in this area in order to prove conclusively some of the simulation results described in Section V. For now, most receiver manufacturers must rely heavily on simulation results of blind DFE's in order to design high-performance receivers for the real-world scenario of low SNR and long, possibly dynamic, multipath channels."

In summary the prior art for HDTV equalizers suffers from:

1. Slow convergence when using the PN sequence for training, and therefore an inability to track Doppler shifts or other dynamic multipath distortion.

2. Poor MSE (noisy) in converged state if a bigger step is used for faster convergence, although step size may be varied (Godard Algorithm).

3. Poor ability to center on the strongest path signal and cancel pre-echoes.

4. Limited range of echo delays due to steep cost rise to get beyond 200 taps.

5. Since a multiply is required for each tap, a large number of multipliers are needed for long delays, adding power consumption.

6. Stability issues when using IIR filters.

Accordingly, some objectives of some embodiments of the present invention are to mitigate one or more of the above problems of time domain equalizers.

SUMMARY

Various embodiments of the present invention are directed to an equalization method. The equalization method may be performed by any of various devices which receive signals. In one set of embodiments, the invention comprises a frequency domain equalization algorithm (FDEA). The FDEA is based on transforming the inbound symbol stream to the frequency domain, multiplying the real-time spectrum by a distortioncanceling spectrum, and then transforming the resulting spectrum back to the time domain for output of a symbol stream in the time domain. The frequency domain equalization algorithm may achieve a number of advantages over conventional digital filters. Such advantages may include the ability to compensate for echoes with greater time separation from the main path, the ability to compensate for pre-echoes as well as post-echoes, the ability to compensate for much more severe Doppler shifts, rapid convergence, and continuous updating.

In one set of embodiments, a method for identifying minor echoes present in an input signal in the situation where two or more major echoes, also present in the input signal, have already been identified, may include: (a) computing a spectrum F corresponding to a sum of the major echoes; (b) computing a weighted power spectrum $S_M$ of the spectrum F; (c) subtracting the weighted power spectrum $S_M$ from a weighted power spectrum of the input signal to obtain a difference spectrum; (d) performing a stabilized division of the difference spectrum by a conjugate of the spectrum F to obtain an intermediate spectrum; (e) computing an inverse transform of the intermediate spectrum to obtain a time-domain signal; (f) estimating one or more of the minor echoes from the time-domain signal to obtain echo parameters for the one or more minor echoes; (g) storing the echo parameters for the one or more minor echoes in a memory, wherein the echo parameters are usable to remove at least a portion of the one or more estimated minor echoes from the input signal.

In some embodiments, the method may also include: removing the two or more major echoes and the one or more minor echoes from the input signal to obtain an equalized signal; recovering information bits from the equalized signal; and providing an output signal to an output device, wherein the output signal is generated based on the information bits.

In one embodiment, the action of removing the two or more major echoes and the one or more minor echoes from the input signal includes: multiplying a spectrum of the input signal by a stabilized reciprocal of an echo spectrum to obtain an equalized spectrum, wherein the echo spectrum is computed based on the echo parameters of at least the one or more minor echoes and echo parameters of the two or more major echoes; and transforming the equalized spectrum to the time domain to obtain the equalized signal.

In some embodiments, the method also includes: adding the one or more estimated minor echoes to the spectrum F to obtain an update of the spectrum F; and repeating (b) through (g) based on the update of the spectrum F in order to estimate one or more additional ones of the minor echoes.

In some embodiments, operation (b) includes: computing a power spectrum $P_F$ of the spectrum F; and multiplying the power spectrum $P_F$ by a spectral weighting function to obtain the weighted power spectrum $S_M$. In one such embodiment, the spectral weighting function is selected from a space of functions {f} to minimize a squared error of a residual $R(\omega) = P_{IN}(\omega) - f(\omega) P_F(\omega)$, wherein $P_{IN}(\omega)$ is the weighted power spectrum of the input signal.

The echo parameters may include one or more delay times of the one or more minor echoes respectively, wherein the one or more delay times are defined relative to a strongest of the major echoes. The delay times may include one or more delay times that are negative.

In one set of embodiments, a method for identifying one or more low-amplitude echoes present in a received signal may include: (a) computing a spectrum $K_e(\omega)$ corresponding to a sum of two or more known echoes in the received signal; (b) computing a power spectrum $P_E(\omega)$ of the received signal; (c) computing a residual spectrum $R(\omega)$ according to the expression $$R(\omega) = P_E(\omega) - f_{MIN}(\omega) |K_e(\omega)|^2,$$

wherein function $f_{MIN}$ is selected from a space of real-valued functions of frequency $\omega$ based on a minimization of the integral or sum of the square of the residual spectrum $R(\omega)$; (d) performing a stabilized division of the residual spectrum $R(\omega)$ by a conjugate of the spectrum $K_e(\omega)$ to obtain an intermediate spectrum; (e) computing an inverse transform of the intermediate spectrum to obtain a time-domain signal; (f) detecting and estimating one or more low-amplitude echoes based on the time-domain signal in order to obtain echo parameters for the one or more low-amplitude echoes; (g) storing the echo parameters for the one or more low-amplitude echoes in a memory, wherein the echo parameters are usable to remove at least a portion of the one or more low-amplitude echoes from the received signal.

In some embodiments, the method may also include: removing the two or more known echoes and the one or more low-amplitude echoes from the received signal to obtain an equalized signal; recovering information bits from the equalized signal; and providing an output signal to an output device, wherein the output signal is generated based on the information bits. In one such embodiment, the action of removing the two or more known echoes and the one or more low-amplitude echoes from the received signal may include multiplying a spectrum of the received signal by a stabilized reciprocal of an echo spectrum to obtain an equalized spectrum, wherein the echo spectrum is computed based on the echo parameters of the one or more low-amplitude echoes and echo parameters of the two or more known echoes; and transforming the equalized spectrum to the time domain to obtain the equalized signal.

In some embodiments, the action (a) of computing the spectrum $K_e(\omega)$ includes: computing a cross correlation signal between a training signal and the received signal; applying a threshold to a magnitude of the cross correlation signal to determine locations in time of peaks that exceed the threshold; modifying the cross correlation by zeroing samples of the cross correlation that lie outside a union of intervals positioned at the respective time locations; and transforming the modified cross correlation to the time domain to obtain the spectrum $K_e(\omega)$.

In some embodiments, the method may also include performing the minimization to determine function $f_{MIN}$.

In some embodiments, the space of real-valued functions is a space of polynomials of degree at most $N_{DEG}$, wherein $N_{DEG}$ is a non-negative integer.

In some embodiments, the action (b) of computing the weighted power spectrum $S_M$ of the spectrum F includes: computing a power spectrum $P_k(\omega)$ based on each window $W_k$ of samples of the received signal, thereby generating a sequence $\{P_k(\omega)\}$ of power spectra; and filtering the sequence of power spectra $\{P_k(\omega)\}$ with respect to window index k to obtain a filtered sequence $\{Q_k(\omega)\}$ of power spectra, wherein the power spectrum $P_E(\omega)$ is a current power spectrum $Q_k(\omega)$ of the filtered sequence.

In some embodiments, the stabilized division of the residual spectrum $R(\omega)$ by a conjugate of the spectrum $K_e(\omega)$ conforms to the expression:

$$\frac{K_e(\omega)}{|K_e(\omega)|^2 + \varepsilon^2} R(\omega),$$

wherein $\varepsilon$ is a real number that is usually non-zero.

In some embodiments, the action of detecting and estimating the one or more low-amplitude echoes based on the time-domain signal includes: multiplying the time-domain signal obtained from action (e) by the absolute value of the cross correlation signal to obtain a product signal, wherein the cross correlation signal is a cross correlation between a training signal and the received signal; and detecting and estimating the one or more low-amplitude echoes based on the product signal in order to enhance the detection of the one or more low-amplitude echoes to obtain the echo parameters for the one or more low-amplitude echoes.

In some embodiments, the action of estimating the one or more low-amplitude echoes based on the time-domain signal includes:

(f1) executing an iterative search to minimize a function B of the form B(y−C*A) with respect to K delay times, wherein K is a positive integer, wherein B is an increasing function of distance between y and the matrix-vector product C*A, wherein y is the time-domain signal, wherein C is a matrix with K columns, wherein the $I^{th}$ column of matrix C represents a copy of a basis pulse delayed by an $I^{th}$ one of the K delay times, wherein A represents a vector of complex coefficients;

(f2) comparing a minimized value of the function to a noise level;

(f3) increasing the order of the function B by incrementing K and repeating (f1) and (f2) if the minimized value of the function B is greater than the noise level;

(f4) storing the minimizing values of the K time delays and a corresponding value of the vector A if the minimized value of the function is less than the noise level, wherein the minimizing values of the K time delays and the corresponding value of the vector A are the echo parameters for the one or more low-amplitude echoes.

In some embodiments, the action of estimating the one or more low-amplitude echoes based on the time-domain signal includes:

(f1) executing an iterative search to minimize a function B of the form B(y−L) with respect to K delay times, wherein K is a positive integer, wherein B is an increasing function of distance between vector y and a linear combination L, wherein vector y is the time-domain signal, wherein the linear combination L has the form:

$$L = \sum_{I=1}^{K} C_I * A^I,$$

where vector $C_I$ represents a copy of a basis pulse delayed by an $I^{th}$ one of the K delay times, wherein $A^I$ is a complex coefficient corresponding to the $I^{th}$ one of the K delay times;

(f2) comparing a minimized value of the function to a noise level;

(f3) increasing the order of the function B by incrementing K and repeating (f1) and (f2) if the minimized value of the function is greater than the noise level;

(f4) storing the minimizing values of the K time delays and corresponding values of the complex coefficients $A^I$ if the minimized value of the function is less than the noise level, wherein the minimizing values of the K time delays and the corresponding values of the complex coefficients $A^I$ are the echo parameters for the one or more low-amplitude echoes.

Embodiments of the present inventions may be realized in any of various forms. For example, any of the present inventions may be realized as a computer-implemented method, a computer-readable memory medium, or a computer system. Furthermore, any of the present inventions may be realized using one or more custom-designed hardware devices such as ASICs or FPGAs.

As defined herein, a memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc. The computer system or device which implements embodiments of the invention may be any of various types of devices which perform wired or wireless communication. Embodiments of the invention may be particularly useful in wireless communication devices, such as in wireless telephones, wireless television/Internet devices, etc. In some embodiments, the computer system may be realized by a multi-processor system as described in U.S. patent application Ser. No. 10/602,292, titled "Processing System With Interspersed Processors And Communication Elements", filed on Jun. 24, 2003.

BRIEF DESCRIPTION OF THE DRAWINGS

A better understanding of the present invention can be obtained when the following detailed description is considered in conjunction with the following drawings, in which.

Figure 1A:
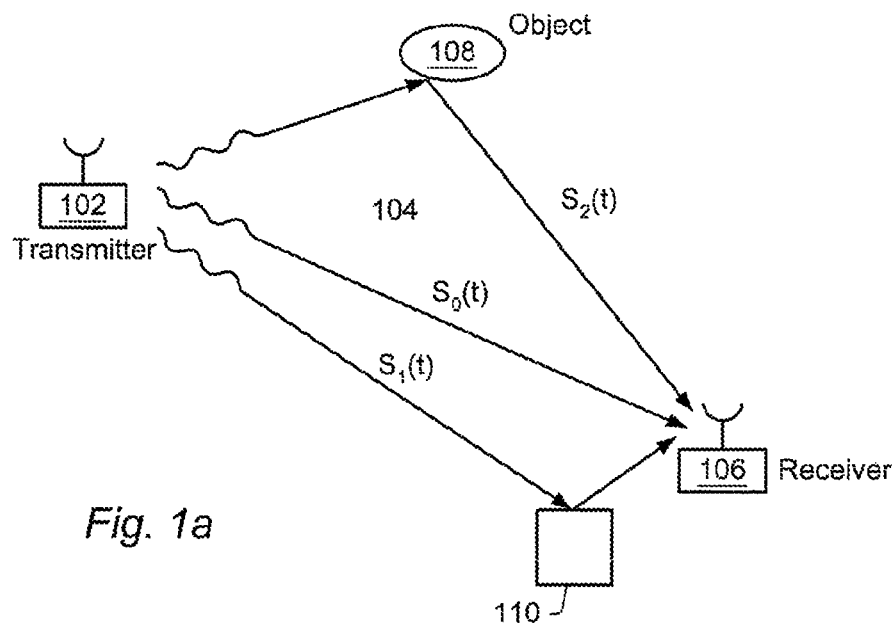
FIGS. 1A & 1B illustrate a communication system including a transmitter which transmits a wireless signal to a receiver through a channel, and further illustrates various multipath distortions that can occur.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. As used herein the term "connected" means "directly or indirectly connected", and the term "coupled" means "directly or indirectly connected". The notation Re(z) is used to represent the real part of the complex number z. The notation Im(z) is used to represent the imaginary part of the complex number z. The notations exp(x) and $e^x$ are used to represent the exponential function acting on the variable x. The notation z* is used to denote the complex conjugate of complex quantity z. The notation |z| is used to represent the modulus of the complex quantity z. The notation $M^T$ is used to represent the transpose of matrix M. The notation $\langle X \rangle$ denotes the expected value of the random quantity X.

DETAILED DESCRIPTION OF THE PREFERRED EMBODIMENTS

Incorporations by Reference

The following patent applications are hereby incorporated by reference in their entirety as though fully and completely set forth herein:

U.S. patent application Ser. No. 12/015,274, filed on Jan. 16, 2008, titled "Frequency Domain Equalization of Communication Signals", invented by Jan D. Garmany and William H. Hallidy, Jr.;

U.S. patent application Ser. No. 10/621,293, titled "Frequency Domain Equalization Algorithm", invented by Jan D. Garmany and William H. Hallidy, Jr.; and U.S. Provisional Application No. 60/396,819, filed on Jul. 18, 2002, titled "Frequency Domain Equalization Algorithm", invented by Jan D. Garmany and William H. Hallidy, Jr.

U.S. patent application Ser. No. 10/602,292, titled "Processing System With Interspersed Processors And Communication Elements", filed on Jun. 24, 2003, invented by Doerr, Hallidy, Gibson and Chase.

Figure 1B:
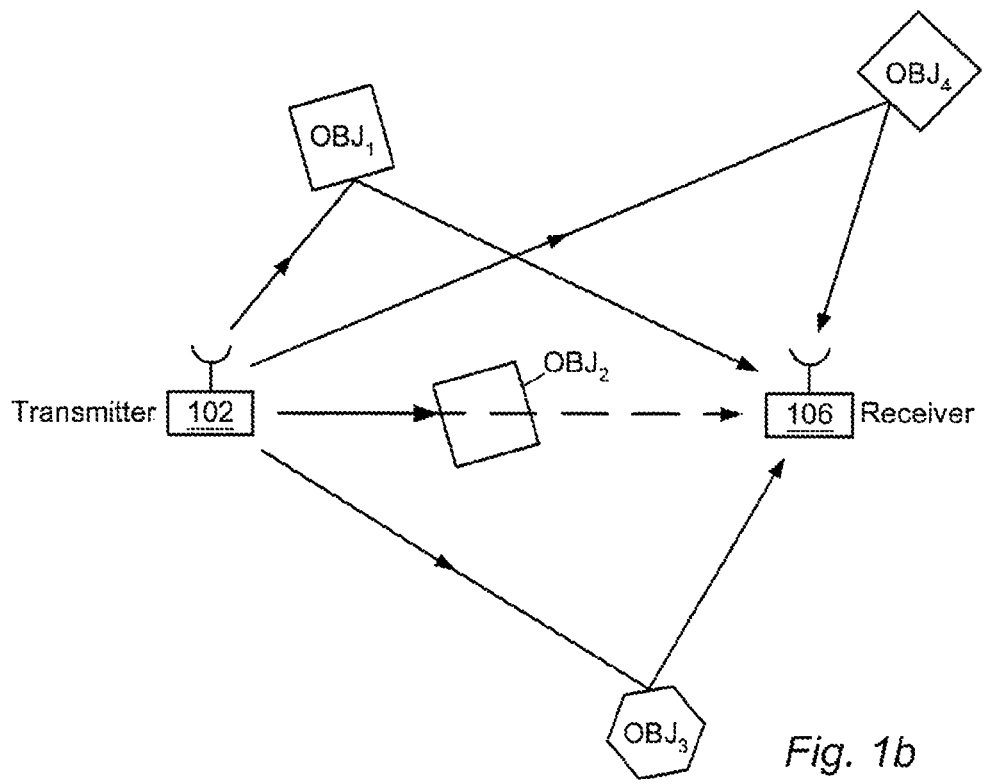

FIGS. 1A and 1B

FIGS. 1A and 1B illustrate an exemplary communication system including a transmitter 102, a channel 104, and a receiver 106. As shown, the transmitter 102 may generate a signal which is intended to be received by the receiver 106. The signal generated by the transmitter 102 propagates through the channel 104 and is received by the receiver 106. As shown in FIG. 1A, as the signal propagates through the channel 104, the signal may experience various types of multipath distortion, including reflections from the ground and/or from various objects such as objects 108 and 110. Examples of various types of objects that can introduce multipath distortion include buildings, homes, vehicles, airplanes, and natural phenomena such as non-level terrain, trees, etc. This multipath distortion may result in various echoes being received by the receiver 106.

FIG. 1B suggests that a direct path between the transmitter and receiver may be occluded. Thus, the "direct" echo component of the received signal may be weaker than later arriving multipath echo components. For example, the signal components reflecting off objects such as $OBJ_1$, $OBJ_3$ and $OBJ_4$ may be stronger than the direct path component due to the attenuating influence of object $OBJ_2$. As used herein, the term "echo" includes the signal component corresponding to the direct path between the transmitter and receiver as well as signal components corresponding to indirect paths.

In one set of embodiments, the receiver 106 includes an equalizer which operates to at least partially compensate for the multipath distortion introduced by the channel 104 into the signal. In one embodiment, the receiver equalizer includes one or more processors and one or more memory media. The one or more memory media store a software program that is executable by the one or more processors to perform an equalization method, e.g., any of the equalization method embodiments described herein. In another embodiment, the receiver equalizer includes a programmable hardware element, such as a field programmable gate array (FPGA), which performs an equalization method, e.g., any of the equalization method embodiments described herein. In yet another embodiment, the receiver equalizer includes an integrated circuit designed to perform an equalization method, e.g., any of the equalization method embodiments described herein. Thus, the receiver equalizer may be implemented in any of various ways, including combinations of the above-mentioned ways, among others.

In one embodiment, the receiver equalizer is implemented by a software program (or a set of software programs) executing on a processing system as described in U.S. patent application Ser. No. 10/602,292, titled "Processing System With Interspersed Processors And Communication Elements", filed on Jun. 24, 2003, invented by Doerr, Hallidy, Gibson and Chase. Patent application Ser. No. 10/602,292 is hereby incorporated by reference in its entirety as though fully and completely set forth herein.

The receiver equalizer described herein may be implemented in any of various kinds of systems. Exemplary systems include a digital television system, a wireless or cellular telephone system, a wireless networking system, etc. Embodiments of the present invention may be used in any of various systems which involve wireless transmission of signals from a transmitter through a transmission medium or channel to a receiver. Embodiments of the present invention may also be used in various types of wired systems where the nature of the wired medium introduces echoes.

As described herein, in one set of embodiments, the present invention comprises a computational method for characterizing a transmission channel, and this channel characterization may then be utilized to perform frequency-domain equalization on a received signal stream. The computational method may operate on the received signal stream to estimate a channel spectrum for the transmission channel. The channel spectrum estimate may then be used to remove (i.e., deconvolve) the effects of the transmission channel from the received signal spectrum.

A principal challenge with equalization in a dynamic channel environment has been accurate estimation of the echo sequence describing the propagation channel. (A channel is said to be "dynamic" when its impulse response varies with respect to time.) A model of the propagation channel can be described in the frequency domain as:

$$E(\omega) = \sum_k a_k \exp(-i\omega\tau_k). \quad (1)$$

Each echo has an associated complex amplitude $a_k$ and path delay $\tau_k$. The complex amplitudes $\{a_k\}$ and path delays $\{\tau_k\}$ are referred to collectively as the "channel parameters". While there may be a large number of terms in the above expression, a desired quality of equalization may be achieved by estimating a significant subset of the terms. (Many of the terms may have such small magnitudes $|a_k|$ as to be negligible.) Computational effort scales with the number of terms being estimated. Thus, there is motivation to limit the number of terms being estimated. The channel estimation (CE) process seeks to estimate a sparse subset of the channel parameters based on samples of the received baseband signal.

In one embodiment, the equalization algorithm may take advantage of known data sequences and the known statistical properties of unknown data sequences in signal transmissions (e.g., 8VSB transmissions) to keep track of the delays and phase shifts encountered in realistic reception conditions. The equalization algorithm may exploit statistical properties of the signal and depend on the use of embedded training sequences of symbols.

In one set of embodiments, the receiver is configured to receive HDTV transmissions, e.g., according to the Advanced Television Systems Committee (ATSC) standard. In the Advanced Television Systems Committee (ATSC) standard for HDTV transmission using 8VSB modulation, the training sequence is a pseudorandom noise (PN) sequence of length 511, denoted as PN511. Correlation of the incoming data with the known PN511 series is performed to determine a correlation function R(t). The correlation function is used to identify multipathing arrivals, i.e., echoes. For example, echoes may be determined by identifying peaks in the magnitude function $|R(t)|$ that exceed a threshold $T_1$, and then analyzing the correlation function R(t) to determine the parameters of the echoes that correspond to the identified peaks. These echoes are referred to herein as "major" echoes. The correlation processing fails to reveal lower amplitude echoes, i.e., echoes that are too weak to give peaks that exceed the threshold $T_R$ in magnitude function $|R(t)|$. These lower amplitude echoes are referred to herein as "minor" echoes. It is important to estimate the minor echoes because equalization on the basis of the major echoes alone is not generally sufficient to produce an intelligible data stream.

In the presence of dynamic multipathing, the relative phases of the various echoes change as a consequence of unequal Doppler shifts. The PN511 sequence recurs at intervals of approximately 24.2 milliseconds at the start of each data field. The ATSC standard calls for the usability of 8VSB by receivers traveling at highway speeds, which may induce Doppler shifts in excess of 100 Hz. Even at a 10 Hz shift, the phase change incurred in the recurrence interval of the PN511 is about 90°. Obviously, the updates of phase obtained from the PN511 correlation are far too infrequent to track the changes in phase adequately.

By itself, the use of the training sequence is not in general sufficient to equalize 8VSB signals in the presence of dynamic multipathing. Statistical properties may be exploited to attempt to solve this problem. However, low complexity recursive least squares (RLS) algorithms may not converge fast enough to be effective (especially in the case of 8VSB signals). Thus it appears that the only widely usable algorithms will be high-complexity, near-optimal methods that approximate as closely as possible the direct removal of multipath distortion by deconvolution.

Background on 8VSB modulation is deemed appropriate. The details of the 8VSB modulation to be used for HDTV transmission are given in the ATSC (Advanced Television Systems Committee) standard in Document A/53B, dated 7 Aug. 2001, which is hereby incorporated by reference. For the purposes of the present application, it is sufficient to describe the 8VSB analog time series as a bandlimited random signal with a known spectrum. The signal is transmitted with a root raised cosine spectrum, and the receiver applies a further filtering by an identical root raised cosine spectrum to yield a raised cosine spectrum for the equalized symbols. The correctly normalized and equalized signal yields eight possible output values, being the odd integers from −7 to +7 inclusively. In practice, the presence of additive noise and errors in equalization causes deviations from these values. The final output value is taken to be the closest valid odd integer to the observed output. This rounding operation is termed "data slicing". The variance of the sliced values, assuming equal probability, is 21. In cases where the signal is determinate, as in the PN511 sequence and the segment synchronization blocks, the symbols assume the values of +5 and −5 only, with variance 25.

The deconvolved signal may be normalized to achieve these variance conditions as a final step of equalization before data slicing.

The essential difficulties with the reception of 8VSB transmissions arise from the effects of multipathing and dynamic propagation paths. The symbol rate for HDTV transmission by 8VSB is approximately 10.76 MHz, yielding a symbol period of 0.093 μs. Observed delays in field tests are measured in the tens of microseconds, leading to severe intersymbol interference.

In order to reverse the effects of interference, it is desirable to rapidly and continuously update the measurements of the amplitude, phase and delay associated with each echo. Here the term "echo" is used to denote the contribution of any single path to the received wavefield, including the dominant path (i.e., the path that contributes the strongest signal component). With a suitable parallel computing engine, it is in principle possible to use a high complexity algorithm that provides nearly optimal equalization.

The method outlined herein may use cross correlations with the PN511 training sequence to determine the properties of the largest echoes. When the input signal-to-noise ratio (SNR) is above the theoretical minimum (approximately 14.8 dB, based on a symbol error rate of 0.2), the largest echoes are always detectable in the PN511 correlation in the presence of a realistic number of echoes (e.g., less than 20 echoes). The detection of echoes is limited by the fixed variance of this correlation. If conditions are static, it may be possible to average these cross correlations to reduce the variance, but generally a more frequently sampled measurement of the channel properties is needed. The method described herein is not limited to cross correlation with the PN511 sequence. Rather, the method also employs autocorrelation of the signal sequences to determine echoes, independent of the presence of an embedded PN511 sequence. In doing so, the method may rapidly reduce the variance of the estimated autocorrelation by stacking (equivalently, averaging) individual autocorrelations to permit the detection of minor echoes that are too small to be revealed by correlation with the PN511 sequence. It is noted that dynamic conditions may limit the number of autocorrelations that may be averaged. These correlations are computed efficiently by the use of the fast Fourier transform (FFT), although the circular buffer effect caused by the FFT assumption of a periodically repeated time series should be taken into account.

While the use of averaged autocorrelations permits the detection of small echoes, it also may introduce ambiguity in the phase and delay of any given echo. In addition, the correlations of the separate echoes with each other leads to a profusion of autocorrelation peaks. These autocorrelation peaks should preferably be winnowed to identify the actual delay of a minor echo with respect to any major echo, most commonly the dominant path. These matters create the greatest difficulties in the development of a practical algorithm.

In one embodiment, the method described herein also addresses the difficulties caused by delays that are not integer multiples of the sample interval, due to propagation or to errors in phase lock in the conversion to baseband.

Figure 2:
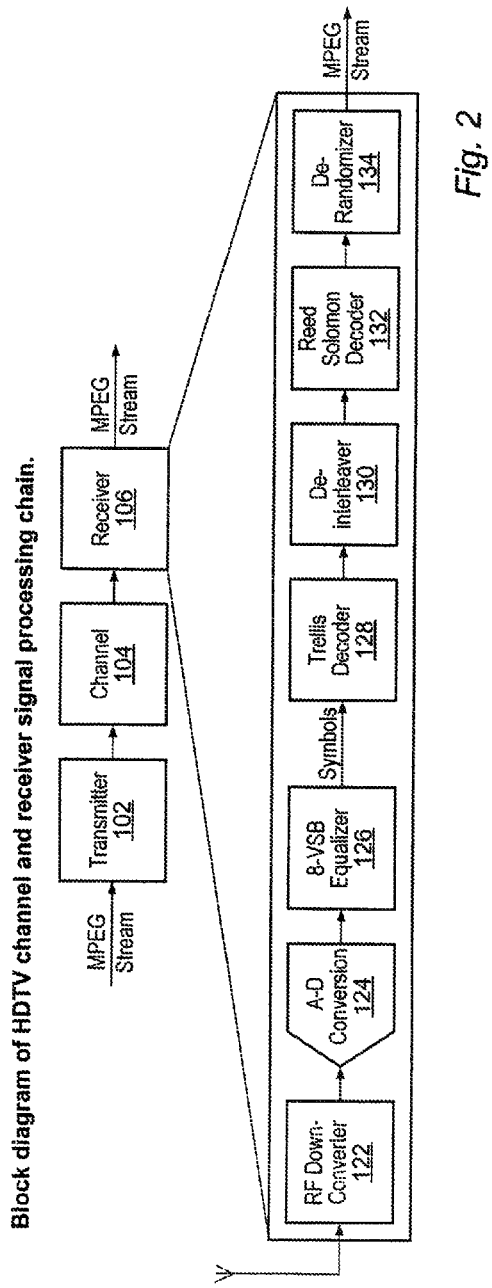
FIG. 2 illustrates a block diagram of a communication system, and includes an exemplary block diagram of the receiver.

FIG. 2 is a block diagram of a communication system (e.g., the communication system exemplified in FIGS. 1A-B). FIG. 2 illustrates a transmitter block 102 which couples through a channel 104 to a receiver block 106. FIG. 2 also illustrates one embodiment of the receiver 106. As shown in this exemplary embodiment, the receiver 106 may comprise an RF downconverter 122, an analog-to-digital (A/D) conversion unit 124, an equalizer 126 (e.g., an 8-VSB equalizer), a trellis decoder 128, a deinterleaver 130, a Reed-Solomon decoder 132, and a derandomizer 134.

The RF down-converter 122 may operate to receive an RF (radio frequency) signal, and convert the RF signal to baseband. The A/D conversion unit 124 may operate to convert the baseband analog signal to a digital data stream. The equalizer 126 may operate to adjust the digital data stream to compensate for multipath distortions. In one set of embodiments, the equalizer 126 may be an 8-VSB equalizer (as suggested in FIG. 2). The equalizer 126 outputs symbols to a trellis decoder 128. The trellis decoder 128 performs forward error correction to remove errors in the symbol stream. The trellis decoder 128 provides its output to the deinterleaver 130. The deinterleaver 130 operates to deinterleave the received symbols. The deinterleaver 130 provides its output to Reed-Solomon decoder 132. The Reed-Solomon decoder 132 performs further error correction and provides its output to derandomizer 134. The derandomizer 134 then outputs the symbol stream, e.g., an MPEG symbol stream.

Figure 3:
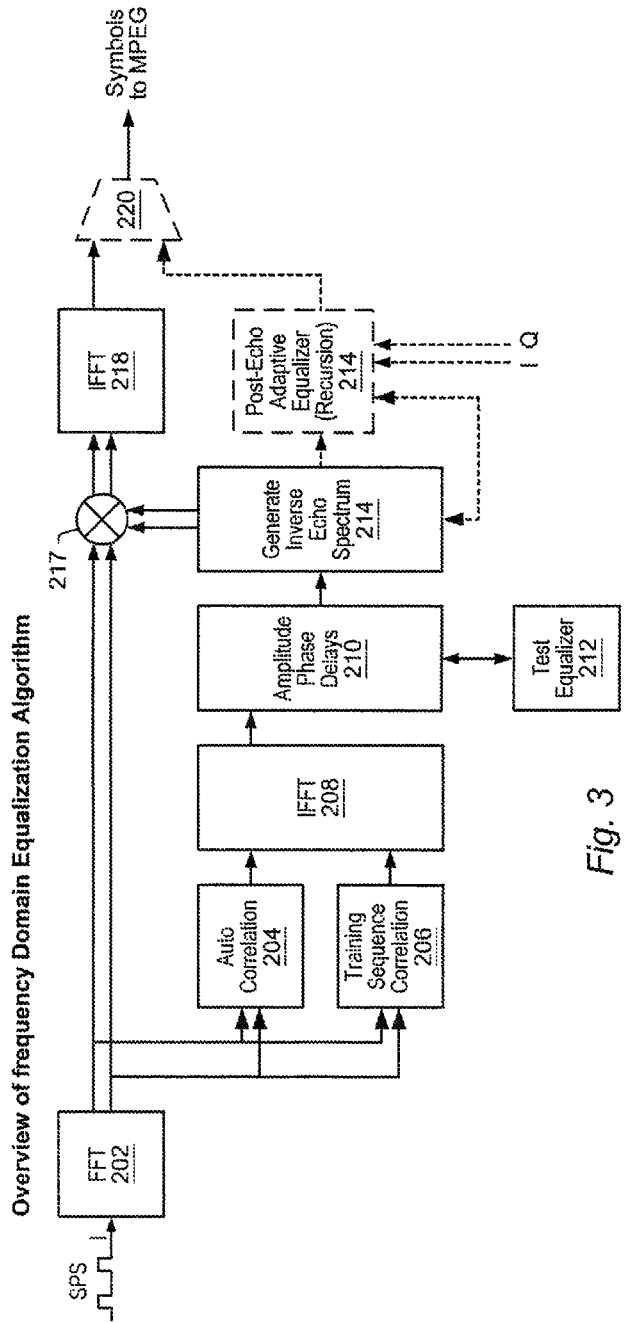
FIG. 3 is a high-level block diagram of the frequency domain equalization algorithm (FDEA) performed in the equalizer of FIG. 2.

FIG. 3 presents an overview of the frequency domain equalization algorithm (FDEA) according to one set of embodiments. The block diagram of FIG. 3 may be used to realize equalizer 126 of FIG. 2.

As shown, the equalizer 126 may include an input for receiving a symbol stream. The received symbol stream is the received version of the transmitted symbol stream, where the received symbol stream may include the effects of multipath distortion. The received symbol stream is buffered, and successive windows of the received symbols are operated on. Preferably, successive windows are overlapping.

The equalizer may include an FFT block 202 which performs a Fourier transform on each window of the received symbol stream to generate a corresponding signal spectrum. The FFT block 202 provides the signal spectrum to a multiplier block 217. The FFT block 202 also provides the signal spectrum to each of an auto correlation block 204 and a training sequence correlation block 206.

The auto correlation block 204 performs a frequency-domain autocorrelation operation on the signal spectrum to obtain a power spectrum, which is provided as output to the inverse FFT block 208.

Where the received signal corresponds to a transmitted training sequence, the training sequence correlation block 206 performs a frequency-domain cross correlation operation relative to the training sequence to obtain a cross spectrum. The cross spectrum is provided as output to the inverse FFT (IFFT) block 208. The cross spectrum is used further downstream to provide synchronization and to estimate the properties of the strongest echoes (the major echoes).

The IFFT block 208 performs an inverse Fourier transform on the power spectrum received from the autocorrelation block 204 to obtain a time-domain autocorrelation signal. The autocorrelation signal is provided to Amplitude Phase Delays block 210. The IFFT block 208 also performs an inverse Fourier transform on the cross spectrum received from the training sequence correlation block 206 to obtain a time-domain cross correlation signal. The cross correlation signal is provided to an Amplitude Phase Delays block 210.

The Amplitude Phase Delays block 210 receives the autocorrelation and cross correlation signals from IFFT block 208 and operates on those signals to obtain the echo parameters (e.g., the amplitudes, phases and delays) of the major and minor echoes. The Amplitude Phase Delays block 210 provides the echo parameters to a Generate Inverse Echo Spectrum block 214.

The Generate Inverse Echo Spectrum block 214 uses the echo parameters to generate an inverse echo spectrum, which is provided as output to a Post-Echo Adaptive Equalizer (Recursion) block 216. The Generate Inverse Echo Spectrum block 214 also provides the inverse echo spectrum to the multiplication block 217. (Multiplication block 217 may also be referred to herein as the "convolution block 217" since multiplication in the frequency domain is equivalent to convolution in the time domain.)

The multiplication block 217 operates to multiply the signal spectrum received from the FFT block 202 with the inverse echo spectrum received from the Generate Inverse Echo Spectrum block 214 to generate a product spectrum. This multiplication operates to remove at least a portion of the echoes (the effects of multipath distortion) from the received signal. The multiplication block 217 provides the product spectrum to an IFFT block 218. The IFFT block 218 performs the inverse Fourier transform on the product spectrum to generate a time-domain symbol stream that represents the output of the equalizer. The time-domain symbol stream is provided to the multiplexer 220.

The Post-Echo Adaptive Equalizer (Recursion) block 216 receives an input from the Generate Inverse Echo Spectrum block 214. The Post-Echo Adaptive Equalizer (Recursion) block 216 also receives inphase (I) and quadrature (Q) inputs from the synchronous detector or forms the analytic signal of the real input data stream. The Post-Echo Adaptive Equalizer (Recursion) block 216 provides an output to the multiplexer 220. The multiplexer 220 selects between the time-domain symbol stream from the IFFT block 218 and the output from the Echo Adaptive Equalizer (Recursion) block 216, and thus, generates an output symbol stream. The Post-Echo Adaptive Equalizer (or recursion equalization) block 216 is optional in some embodiments.

In one set of embodiments, the FDEA control may be broken down into the following functions:

1. Synchronize Signal
   (a) Cross-correlate the stored training sequence with incoming data to locate the training sequence in the data stream.
   (b) Locate peaks in the cross-correlation that are above a threshold $T_1$ for signal equalization and symbol synchronization.
2. Locate Echoes (Done periodically)
   (a) Form the analytic signal corresponding to the average autocorrelation by inverse Fourier transforming an average of power spectra (over nonnegative frequencies).
   (b) Form the amplitude envelope of the average autocorrelation.
   (c) Determine threshold $T_2$ and peaks of the amplitude envelope using the threshold $T_2$.
   (d) Determine the correct placement of echoes (including dominant echo, pre-echoes and post-echoes).
3. Generate Echo Sequence
   (a) Determine amplitudes and phases of echoes in echo sequence;
   (b) Determine a subwindow for equalization;
   (c) Combine amplitudes, phases, and delays to generate the echo sequence.
4. Form the Inverse Echo Sequence
   (a) Use stabilized deconvolution to form the inverse echo spectrum;
   (b) Invert the stabilized spectrum to obtain the inverse echo sequence;
   (c) Determine the optimum equalization segments in the data window from the properties of the inverse echo sequence.
5. Deconvolve the echo sequence from the data sequences
6. Do Final Inphase (I) Signal Equalization
   (a) Do final spectral shaping on equalized data;
   (b) Perform amplitude normalization on the I symbol sequence;
   (c) "Dataslice" the normalized I symbol sequence.

The above functions are described in detail below.

Figure 4A:
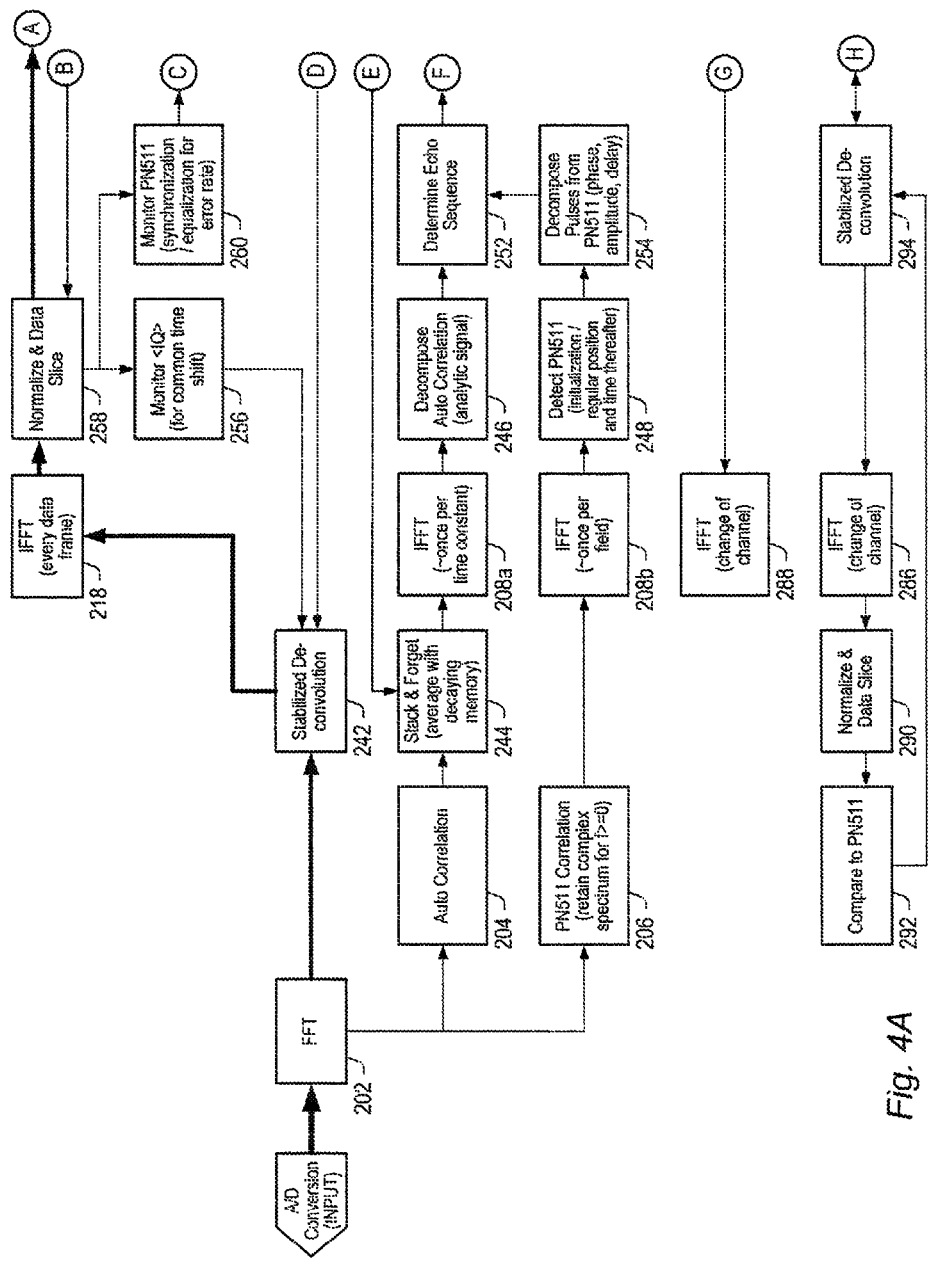
FIGS. 4A-B is a flowchart of one set of embodiments of the frequency domain equalization algorithm (FDEA) performed by the equalizer of FIG. 2.
Figure 4B:
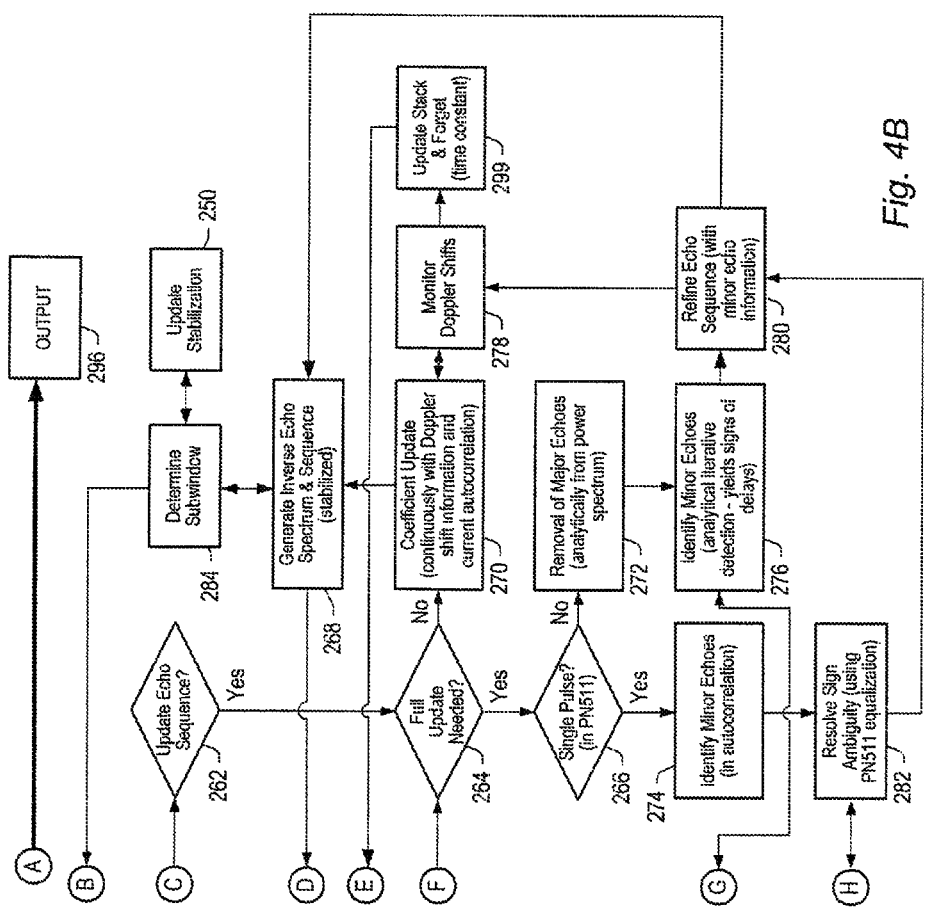

FIGS. 4A-B: Flowchart Description of FDEA

FIGS. 4A-B present a flowchart description of one set of embodiments of the computational method, i.e., the frequency domain equalization algorithm.

FFT module 202 operates on windows of samples of the input signal, i.e., computes a fast Fourier transform (FFT) of each window to generate a corresponding signal spectrum. Thus, FFT module 202 generates a stream $S_1$ of signal spectra. Successive windows may overlap as indicated below.

Deconvolution module 242 performs a stabilized deconvolution operation on each signal spectrum of the stream $S_1$, using a current estimate of the inverse echo spectrum (i.e., a stabilized reciprocal of the current echo spectrum estimate), to obtain a stream $S_2$ of deconvolved spectra. Module 268 may provide the current estimate of the inverse echo spectrum.

Deconvolution module 242 may perform the stabilized deconvolution on a signal spectrum of the stream $S_1$ by multiplying the signal spectrum by the current inverse echo spectrum estimate to obtain a corresponding deconvolved spectrum of the stream $S_2$.

The computational method may generate updates of the echo spectrum estimate to track changes in phases, amplitudes and delay times of echoes.

Inverse transform module 218 performs an inverse FFT on each deconvolved spectrum of the stream $S_2$ to generate a stream $S_3$ of deconvolved blocks of samples in the time-domain. The deconvolved blocks of the stream $S_3$ may be referred to herein as equalization windows as they contain equalized samples. (The stabilized deconvolution operation is interpreted as a frequency-domain equalization process.)

Module 258 may perform normalization and data slicing on each deconvolved block of stream $S_3$ to generate a stream $S_4$ of output blocks. The stream $S_4$ of output blocks may be forwarded to output module 296.

Output module 296 operates on the output blocks of the stream $S_4$ to recover a sequence of information symbols. The information symbols may be used to generate an analog signal which drives an output device. The output device may be a television (e.g., an HDTV television), a monitor (e.g., an LCD display or CRT display), a set of one or more speakers, a transmit antenna, a network interface device (e.g., an Ethernet card).

Autocorrelation module 204 performs a frequency-domain autocorrelation operation on each signal spectrum of the stream $S_1$ to generate a stream $S_5$ of power spectra. Averaging module 244 may perform an averaging operation on the stream $S_5$ of power spectra to generate a stream $S_6$ of averaged power spectra. The averaging operation may be implemented with a recursive filter (e.g., an IIR filter of the form given by equation (17)) which has a decaying memory of past inputs. Thus, the averaging operation may be referred to herein as a "stack and forget" operation. The recursive filter has an associated time constant which is an indicator of the time required to effectively forget a given input stimulus to the recursive filter. In some alternative embodiments, the averaging operation may be implemented with an FIR filter.

The inverse transform module 208A may perform an inverse transform on an averaged power spectrum from the stream $S_6$ approximately once per time constant of the recursive filter. The inverse transform generates an averaged autocorrelation function.

Module 246 may perform a pulse decomposition on the analytic signal of the autocorrelation function to obtain estimates for the locations (in time) and complex coefficients for peaks in the envelope of the analytic signal of the autocorrelation function. The section below entitled "Pulse Decomposition" describes the pulse decomposition process mostly in terms of the cross-correlation function. However, this process applies also to the autocorrelation function.

Cross-correlation module 206 performs a frequency-domain cross-correlation between each signal spectrum of the stream $S_1$ and the spectrum of a known training sequence to generate a stream $S_7$ of cross-correlation spectra.

In an initial echo acquisition mode, inverse transform module 208B may perform an inverse transform on each cross-correlation spectrum of the stream $S_7$ to determine a stream $S_8$ of cross-correlation signals, and detection module 248 may scan an amplitude envelope of each cross-correlation signal of the stream $S_8$ to determine a first cross-correlation signal containing a sufficiently large pulse indicating an occurrence of the training sequence in the received signal stream. Once the location $L_{TS}$ of the training sequence in the received signal stream has been established, inverse transform module 208B may operate less frequently.

For some signal transmissions, it is valid to assume that the training signal occurs periodically (e.g., once per field of an 8VSB transmission). Thus, in response to establishing the location $L_{TS}$, the windowing of the received sample stream may be adjusted so that the training sequence occurs in the middle of every $N^{th}$ window. Therefore, the inverse transform module 208B may perform an inverse transform on every $N^{th}$ cross-correlation spectrum from the stream $S_7$.

Pulse decomposition module 254 may operate on a cross-correlation signal generated by the inverse transform module 208B and its corresponding amplitude envelope generated by the detection module 248 to determine complex coefficients (containing amplitude and phase information) and delay times for a set of major echoes. See the section below entitled "Pulse Decomposition" for a description of the pulse decomposition operation.

Echo sequencing module 252 may invoke a full update of the echo sequence using the cross correlation information and autocorrelation information, or, invoke a partial update of the echo phases using autocorrelation information alone. Full updates may be performed when necessary (e.g., when the channel is changed or an echo delay changes measurably). Partial updates may be performed at a higher rate than full updates in order to maintain the quality of equalization.

In step 264, a full update test may be performed to determine if a full update of the echo sequence is needed. The full update test may include determining if the delay of any echo of the current set of echoes has changed by an amount greater than a delay difference threshold. If one or more of the delays have changed by more than the threshold amount, a full update of the set of echoes may be invoked by passing control to step 266. If none of the delays have changed by more than the threshold amount, control may pass to coefficient update module 270.

Coefficient update module 270 may update the complex coefficients of the current set of echoes based on current estimates $D_E$ of the delay times of the current set of echoes. For example, coefficient update module 270 may update the complex coefficients as indicated by expression (30). For example, the current estimates $D_E$ of the delay times may be the delay time values computed during the most recent full update, or perhaps, the output of a predictive filtering operation on the sets of delay times computed during the full updates.

Doppler shift module 278 may compute differences of the echo phases between a current update and a previous update of the complex coefficients. The current update of the complex coefficients may be supplied by coefficient update module 270 or refinement module 280.

Rate control module 299 may update a recursion coefficient (e.g., the coefficient α of IIR filter (17)) based on the computed phase differences. The magnitude of the recursion coefficient may be a decreasing function of the maximum of the absolute values of the phase differences. For example, the recursion coefficient may be set equal to 0.3 for very fast-changing phases or 0.95 for slowly changing phases. The recursion coefficient is used in the averaging operation performed by averaging module 244.

In step 266, a single pulse test may be performed to determine if the number $N_P$ of pulses, of sufficient amplitude, detected in the amplitude envelope of the most recent cross-correlation signal (or alternatively, the next available cross-correlation signal), is equal to one. If the number $N_P$ equals one, control may pass to module 274. Otherwise (i.e., if the number $N_P$ is greater than one) control may pass to module 272.

Sieving module 274 identifies minor echoes up to a complex-conjugate symmetry by operating on a filtered autocorrelation signal according to a pulse-sieving algorithm described below. The complex-conjugate symmetry implies that the delay times of the identified minor echoes have ambiguous signs.

Resolution module 282 operates on the minor echoes identified by sieving module 274 to obtain the complex coefficients and to resolve the signs of the delay times of the minor echoes. Resolution module 282 may invoke a processing loop comprising steps 294, 286, 290 and 292.

Removal module 272 generates an estimate for the spectrum K corresponding to the superposition of the major echoes (determined by the pulse decomposition module 254), and subtracts the power spectrum $|K^2|$ from a power spectrum of the received signal (e.g., one of the averaged power spectra generated by averaging module 244). The subtraction results in a residual spectrum.

Identification module 276 estimates delay times and complex coefficients of the minor echoes using information including the residual spectrum and the estimate of the power spectrum K. Identification module 276 may operate according to the algorithm described below in connection with equations (35) and (36), or preferably, according to the algorithm described below in connection with equations (43) and (44). Identification module 276 may call inverse FFT module 288.

Refinement module 280 generates an update of the complete echo sequence (including delay times and complex coefficients) using (a) the major echo data computed by pulse decomposition module 254 and (b) minor echo data supplied by the resolution module 282 or the identification module 276.

Module 268 may receive data $D_E$ defining a current estimate of the echo sequence from the coefficient update module 270 or from refinement module 280. The echo sequence is defined by the complex coefficients and the time delays of the major echoes and minor echoes. In the case of a full update, the refinement module 280 supplies the updated time delays and updated complex coefficients it has just computed. In the case of a partial update, the coefficient update module 270 may supply the updated complex coefficients and the current estimates $D_E$ of the delay times.

Module 268 may compute an estimate of the inverse echo spectrum from the data $D_E$. In particular, module 268 may first compute an estimate of the echo spectrum (i.e., the channel spectrum) according to the expression (28) from the data $D_E$, and then compute a stabilized reciprocal $R_S$ of the echo spectrum estimate. The inverse echo spectrum estimate $R_S$ may be forwarded to deconvolution module 242.

Module 268 may additionally compute an inverse echo sequence estimate by performing an inverse FFT on the inverse echo spectrum estimate $R_S$. The inverse echo sequence estimate may be forwarded to subwindow determination module 284.

Not all parts of the current equalization window are of equal quality because of the finite damping time of the inverse echo sequence estimate. Thus, subwindow determination module 284 may determine a subwindow of the current equalization window based on the inverse echo sequence estimate, i.e., a subwindow over which the quality of equalization may be deemed to be sufficient. Subwindow determination may be performed according to the methodology described in the section entitled "Data Normalization and Slicing".

A specification of the subwindow may be forwarded to module 258. Module 258 may discard equalized data outside the subwindow from the current equalization window.

Stabilization update module 250 may compute an update for one or more stabilization parameters (e.g., the parameter epsilon of expression (37)) using results generated by the subwindow determination module 284 (e.g., infinity norms of the inverse echo sequence computed on subintervals of the current equalization window). The one or more updated stabilization parameters may be forwarded to module 268 through subwindow determination module 284.

Module 268 may recompute the inverse echo spectrum estimate and the inverse echo sequence estimate from the echo spectrum estimate using the one or more updated stabilization parameters. The recomputed inverse echo spectrum estimate may be forwarded to deconvolution module 242. The recomputed inverse echo sequence estimate may be forwarded to subwindow determination module 284.

Signal Processing and Measurements

We presume wide sense stationarity of the 8VSB signal to simplify the calculation of expectations, so that expectations are given by averages over time. We also omit additive noise in most of the discussions. We let the sample period be 1, so that the frequency range is from −0.5 to 0.5 (−π to π in radian frequency). In one embodiment, we use 2 samples per symbol, so that the symbol frequency scales to 0.25.

The discrete Fourier transform is defined by $$s_k = \sum_n u_n \exp(-2\pi i k n / N). \tag{1}$$

The sum is from n=0 to n=N−1. In some embodiments, N is a power of two. The series s is termed the spectrum of the sampled time series u. The (signed) frequency is given by k/N for k≤N/2, and (k−N)/N for N/2<k≤N−1. The transform back to the time domain is:

$$u_n = \frac{1}{N}\sum_k s_k \exp(2\pi i k n / N). \tag{2}$$

The time series we use are complex analytical signals, where the imaginary part is given by the Hilbert transform of the real part. We obtain the Hilbert transform by transforming to the frequency domain, multiplying positive frequency terms by −i and negative frequency terms by i. The element corresponding to zero frequency is multiplied by zero. An inverse transform to the time domain then yields the Hilbert transform. This convention is analogous to convolution with 1/πt.

We define $$\langle f \rangle = \lim_{N \to \infty} \frac{1}{N} \sum f_n \tag{3}$$

and $$\langle f^* g \rangle = \lim_{N \to \infty} \frac{1}{N} \sum f_n^* g_n = \langle g^* f \rangle^* \tag{4}$$

where * denotes complex conjugation.

Variance of Summed Echoes

Let f(t) be the analytical signal associated with a signal transmission, e.g., an 8VSB transmission). The sampled data from the $k^{th}$ echo may be written as $$f_{n-\tau_k} = f(n-\tau_k), \tag{5}$$

where $\tau_k$ is the time delay associated with the $k^{th}$ echo.

An arbitrary echo-contaminated sequence may be written as $$g_n = \sum_k a_k f_{n-\tau_k}, \tag{6}$$

where the coefficients $a_k$ are complex. We take f to be a zero-mean function, i.e., $\langle f \rangle = 0$. Then the variance of g is $$\langle g^* g \rangle = \sum_{j,k} a_j^* \langle f_{n-\tau_j}^* f_{n-\tau_k} \rangle a_k = a^* \Gamma a \tag{7}$$

where the jk element of the Hermitian matrix Γ is the complex correlation shown under the summation in (7). For delay differences $|\tau_j - \tau_k|$ larger than the symbol time, the off-diagonal elements of Γ are small. For most purposes, we may take Γ to be the identity matrix times the variance of f. The variance of f is given by $\sigma^2 = \langle f^* f \rangle$. We then approximate the variance of a sum of echoes to be $$\langle g^* g \rangle \approx \sigma^2 \Sigma |a_k|^2. \tag{8}$$

Correlation with the Training Sequence

We take the PN sequence to be nonzero only for one point per symbol, without convolution with any bandlimited pulse. This representation is therefore not an analytic signal: it is taken to be real. At the on-sample points it has the value specified in the ATSC standard.

Define $$g_n = \sum_k p_k f_{n+k}, \tag{9}$$

where $p_k$ is the PN511 sequence. This finite series will have some random hash (that is, g is a random sequence) in the absence of a PN sequence in f. We may show that the variance of (9) is $$\langle g^* g \rangle \approx 511 \times \sigma_p^2 \sigma^2. \tag{10}$$

Here, $\sigma_p^2$ is the variance of the (nonzero) elements of the PN sequence. If there is a PN sequence imbedded in f, there will be a peak of amplitude $511 \times \sigma_p^2$. The ratio of the peak amplitude to the RMS level of g is $(511)^{1/2} \sigma_p / \sigma$. In the presence of multiple echoes, this ratio becomes, using the approximation in (8), $$\frac{\text{correlation peak}}{\text{RMS variation}} = \frac{(511)^{1/2} \sigma_p |a_j|}{\sigma (\sum |a_k|^2)^{1/2}} \approx \frac{(511)^{1/2}}{m^{1/2}} \tag{11}$$

for the $j^{th}$ echo. The rightmost expression gives a worst-case estimate for m equal strength echoes. In order to avoid errors in identification, it is important that we set the amplitude threshold sufficiently high for acceptance of a peak. A ratio of approximately 5 in (11) gives an acceptable error rate (approximately 0.001 errors in 4096 points). In the best case of a single dominant path and a single weaker path, the weaker path may be detectable to approximately −13 dB, but −10 dB is probably the lowest reliable level below the maximum peak. The background random variation is lower within 511 symbol-periods of large correlation peaks, due to the self-orthogonality of the PN sequence. However, detectability degrades in the presence of two or more large echoes.

Variance of Autocorrelation

If we define $$g_m = \sum_{k=0}^{N-1} f_k^* f_{k+m}, \tag{12}$$

and evaluate the variance of g, we obtain $$\langle g^* g \rangle = N \sigma^4 = \sigma_a^2. \tag{13}$$

This is the expected value for disjoint windows of N points (m>N). In the presence of multiple arrivals, this becomes $$<g^*g> = N\sigma^4(\Sigma|a_k|^2)^2. \quad (14)$$

This result neglects the effects caused by independent sets of identical delay-time differences. We expect such occurrences to be rare and to have modest effects. For autocorrelations of data in a window, we expect to see peaks of (complex) amplitude $$q_{peak} = a^*_j a_k \sigma^2 (N - |n_j - n_k|) \quad (15)$$

where $n_k$ is the delay of the kth echo. The time over which the data are correlated is reduced by the relative delay between the echoes, which affects the peak amplitudes.

The peaks are deterministic if the echo properties are constant over time, while the realizations of g may be treated as random. Thus, with a stack of M autocorrelations, the ratio of peak amplitudes to the underlying hash behaves as $$M^{1/2} N^{1/2} \frac{|a^*_j a_k|}{(\Sigma|a_i|^2)} \quad (16)$$

neglecting the amplitude effect in (15) due to the (generally) small delay differences. In principle, we may stack as many autocorrelations as we wish to reveal arbitrarily small echoes, but in practice the number of realizations may be limited by time variations in the properties of the echoes.

Autocorrelation Stacking for Detection of Minor Echoes

In practical computations, we work with finite windows (e.g., N=4096 in one embodiment) and ultimately finite data. In the following, we use the terms correlation and autocorrelation to denote finite sums of the form $$r_m = \sum_{k=0}^{N-1} f^*_k g_{(k+m) \bmod N}. \quad (4')$$

Note that we omit normalization by N and employ a circular buffer. We may regard the realizations of the autocorrelation as being composed of a random and a deterministic component, as shown above. Instead of directly summing a set of autocorrelations, we use a stacking that has a fading memory of older autocorrelations but continuously updates the estimate of the stacked values using more recent data. Let q be the nominally constant deterministic component, and let $n_k$ be the $k^{th}$ realization of the random component. We define the continuously updated stack as $$y_k = q + n_k + \alpha y_{k-1}. \quad (17)$$

The quantities q, $n_k$, $y_k$ and $y_{k-1}$ are interpreted as vectors (or sequences) of length N. Thus, the additions indicated in expression (17) are vector additions. The deterministic component y of $y_k$ tends to the value $$y \to q/(1-\alpha) \quad (18)$$

The estimate of q is then asymptotically $(1-\alpha)y$.

The variance of an arbitrary element of the noise term after stacking is $$(\Sigma|a_i|^2)^2 \sigma_a^2/(1-\alpha) \quad (19)$$

in the presence of multiple echoes, and using (14). After normalizing to obtain q directly, the variance is reduced by a factor of $(1-\alpha)^2$ to yield a noise power of $$\frac{(1-\alpha)^2}{(1-\alpha^2)}(\sum|a_i|^2)^2 \sigma_a^2 = \frac{1-\alpha}{1+\alpha}(\sum|a_i|^2)^2 \sigma_a^2. \quad (20)$$

The choice of $\alpha=0.8$ yields a leading factor $(1-\alpha)/(1+\alpha)=\frac{1}{9}$, and thus the equivalent noise reduction of stacking 9 autocorrelations. The contribution of the $10^{th}$ previous autocorrelation is reduced to 11%, so that the most recent realizations are strongly weighted, as was intended. Smaller values of $\alpha$ lead to faster decay of the contribution of older autocorrelations, but result in less reduction of noise. In highly dynamic situations, the decay time may have to be reduced in this manner.

Practical Calculations and Effects of Finite Bandwidth

The relatively fast roll-off of the 8VSB spectrum creates substantial ringing that makes peak selection difficult. To mitigate this problem, we use a weighting function in the frequency domain to multiply the products of spectra encountered in the calculation of correlations:

$$w(f) = \begin{cases} 1 + \cos 4\pi f & |f| < 0.25 \\ 0 & |f| \geq 0.25. \end{cases} \quad (21)$$

Because of the finite bandwidth of the data, the time resolution of the measured delays is limited. The filtering of spectral products by (21) slightly worsens the time resolution, but it has the beneficial result of greatly simplifying the correlation peaks.

The choice of the limiting frequency of f=±0.25 reflects the use of 2 samples per symbol and the fact that the roll-off in the raised cosine spectrum occurs at half the Nyquist frequency. The Fourier transform of w filters the band-passed form of a spike (constant spectrum) and yields the real part of the basis for decomposition of pulses in the time domain:

$$s(t) = \int_{-0.25}^{0.25} df \, e^{2\pi i f t} w(f) \quad (22)$$

$$= \frac{\sin\frac{\pi}{2} t}{\pi t} + \frac{1}{2} \left[ \frac{\sin\frac{\pi}{2}(t+2)}{\pi(t+2)} + \frac{\sin\frac{\pi}{2}(t-2)}{\pi(t-2)} \right]$$

The small amount of roll-off in the signal spectrum before frequency 0.25 deviates from the assumption of a white spectrum in (22), but the errors we incur are very slight (−75 dB) because of the small magnitude of w in this region. We rewrite (22) in terms of the sin c function as $$s(t) = \frac{1}{2} \left\{ \text{sinc}\left(\frac{\pi t}{2}\right) + \frac{1}{2}\left[\text{sinc}\left(\frac{\pi(t-2)}{2}\right) + \text{sinc}\left(\frac{\pi(t+2)}{2}\right)\right] \right\}. \quad (23)$$

The Hilbert transform of (23) may be written as $$h(t) = \frac{1}{2} \left\{ h\text{sinc}\left(\frac{\pi t}{2}\right) + \frac{1}{2}\left[h\text{sinc}\left(\frac{\pi(t-2)}{2}\right) + h\text{sinc}\left(\frac{\pi(t+2)}{2}\right)\right] \right\}. \quad (24)$$

The sin c and h sin c functions are given by:

$$\operatorname{sinc}(x) = \frac{\sin x}{x} \quad (25)$$

$$h\operatorname{sinc}(x) = \frac{1 - \cos x}{x}. \quad (26)$$

The complex pulse $$s(t) + ih(t) = 2 \int_0^{0.25} df \exp(2\pi ift) w(f) \quad (27)$$

is the basis for representation of the weighted correlation or autocorrelation peaks. The one-sided spectrum is the converse of the Kramers-Kronig relation: instead of causality in time, the Hilbert transform relation between the real and imaginary parts of the complex time series leads to "causality" in frequency.

Figure 5:
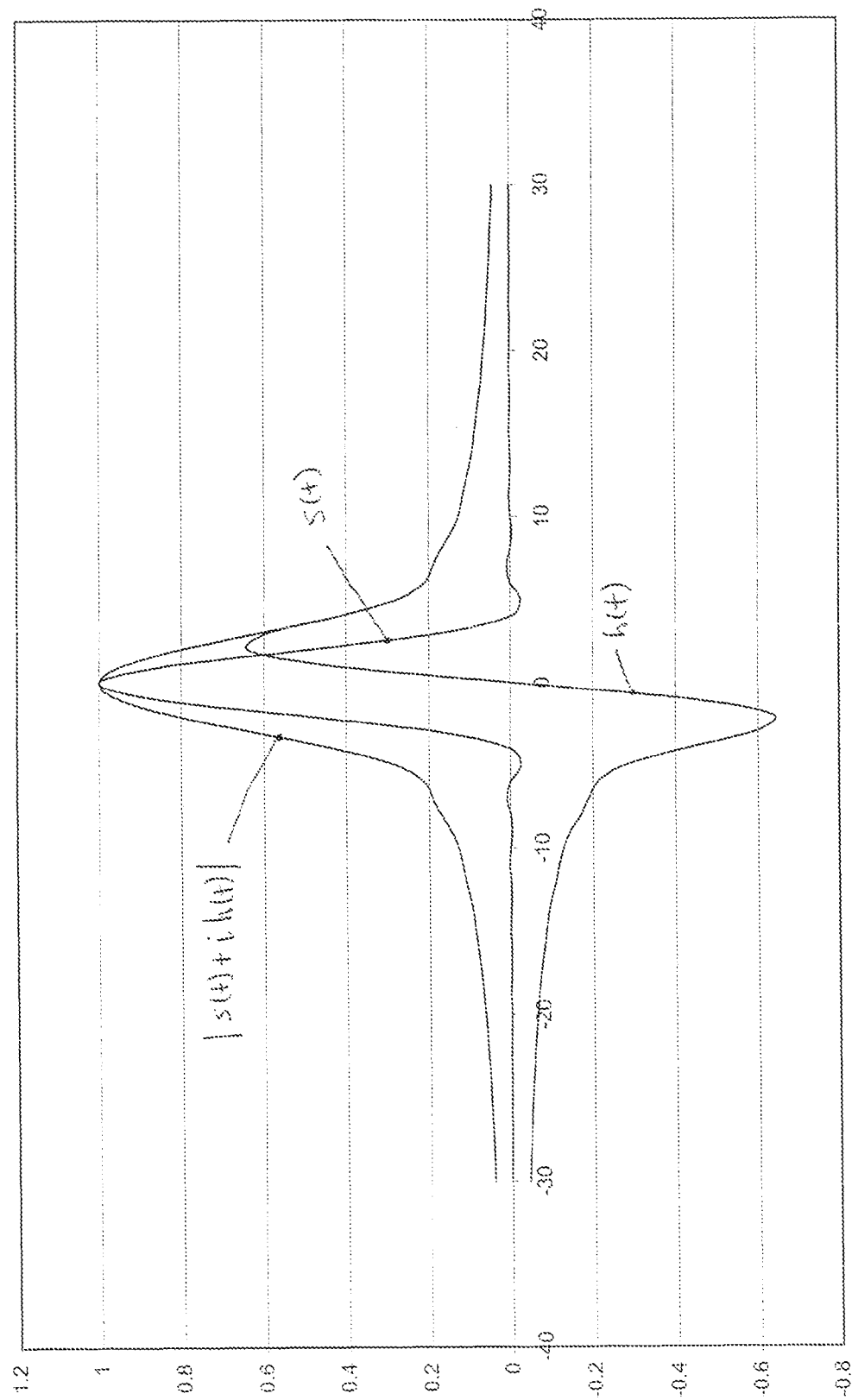
FIG. 5 is a graph illustrating the real part, imaginary part and amplitude envelope of a complex basis pulse.

FIG. 5 shows the complex pulse used to analyze the pulses in the time domain derived from the weighted correlations. In particular, note that the envelope has only a single maximum. The complex pulse was derived from equations (22) through (27). The peak value is 1. The abscissa is samples, 2 samples per symbol.

Pulse Decomposition

The most troublesome aspect of the equalization problem has been the accurate definition of the echo sequence that defines the propagation channel. The presumed model of the channel is a set of discrete echoes. In the frequency domain, this model has the form $$E(f) = \sum_k a_k \exp(-2\pi i f \tau_k) \quad (28)$$

The weighted correlation formed by tapering (e.g., multiplying) this function with w(f) from (21) and transforming to the time domain is a sum of pulses of the form (27) with delays $\tau_k$ and with the amplitudes and phases given by the coefficients $a_k$. With ever longer training sequences, we could approximate this simple result with greater and greater accuracy. However, the correlation with the PN511 sequence shows more complexity, as shown in the following figures. Because of the finite bandwidth, the pulses may mutually interfere, making the recognition of separate echoes more difficult. Features of the PN511 correlation are visible, particularly the pulse amplitudes and the variability of the RMS variation near the correlation peaks. Because the data and the basis pulses are band-limited, the recovery of the locations of the pulses is ill-posed. If we were to allow a pulse to arise at every possible sample, the resulting linear system would actually be singular.

Figure 6A:
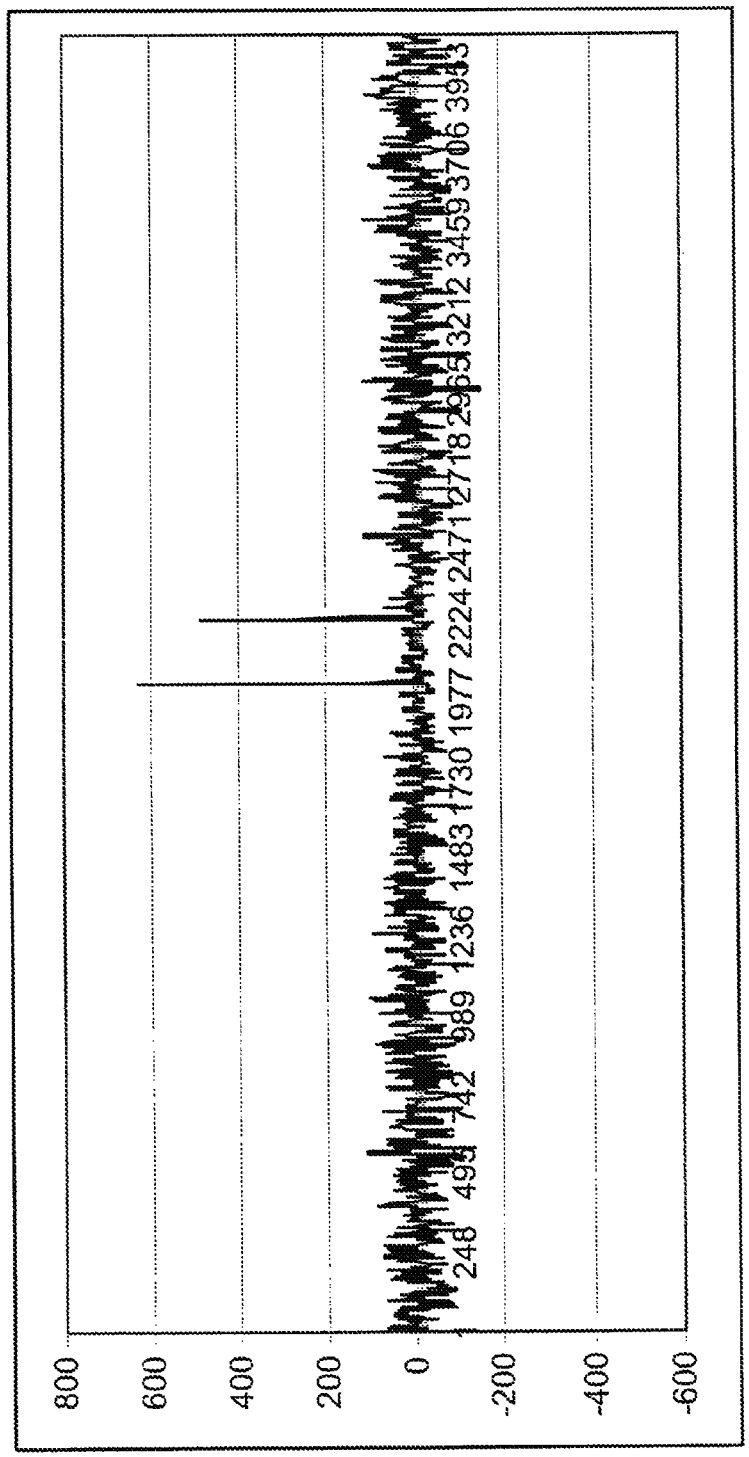
FIGS. 6A & 6B illustrate the real and imaginary parts of the PN511 correlation and shows two echoes.
Figure 6B:
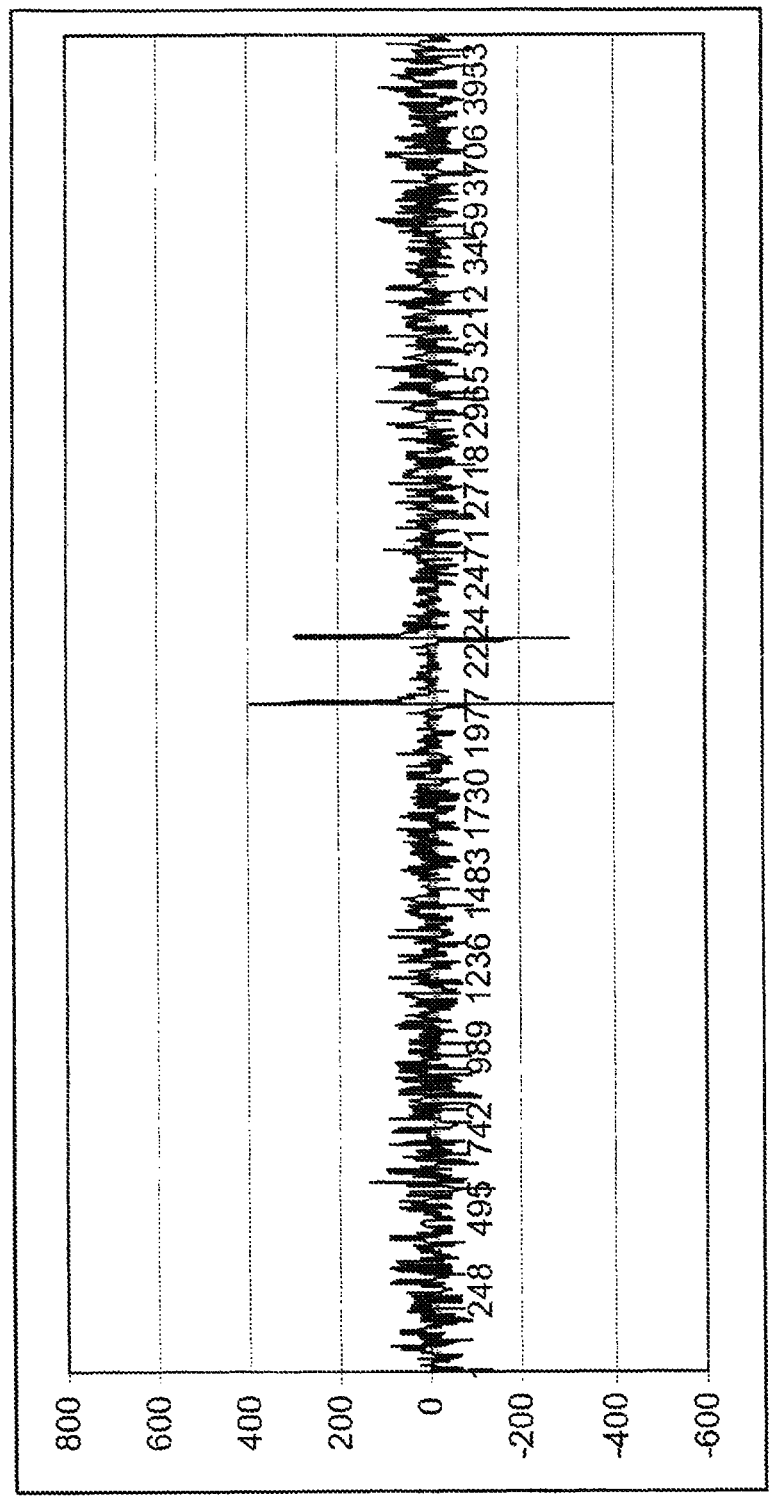

FIGS. 6A and 6B illustrate a PN511 correlation with two echoes. (FIG. 6A shows the real part, and FIG. 6B shows the imaginary part.) Peak values and background variances are consistent with theory. Numerical modeling uses reference PN series with values ±0.5, but the 8VSB signal is properly normalized. There is an additional factor of 0.5 present because of the average of the weighting function w(f). Predicted peak=638.75, observed=632. Predicted RMS variation=52, observed=51. Note the reduction of variation near pulses.

Figure 7:
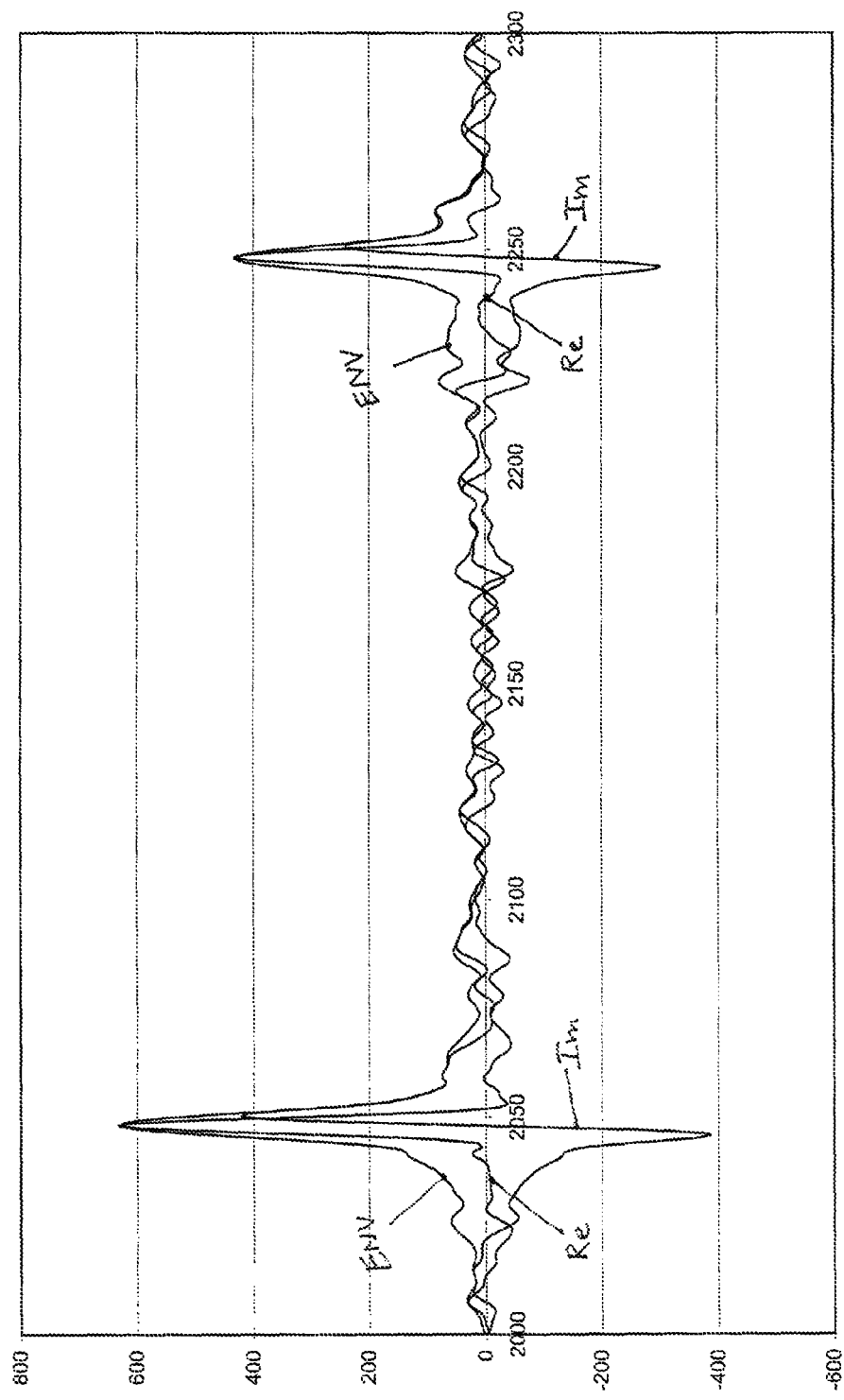
FIG. 7 is a close-up of the PN511 correlation showing well separated zero-phase pulses.
Figure 8:
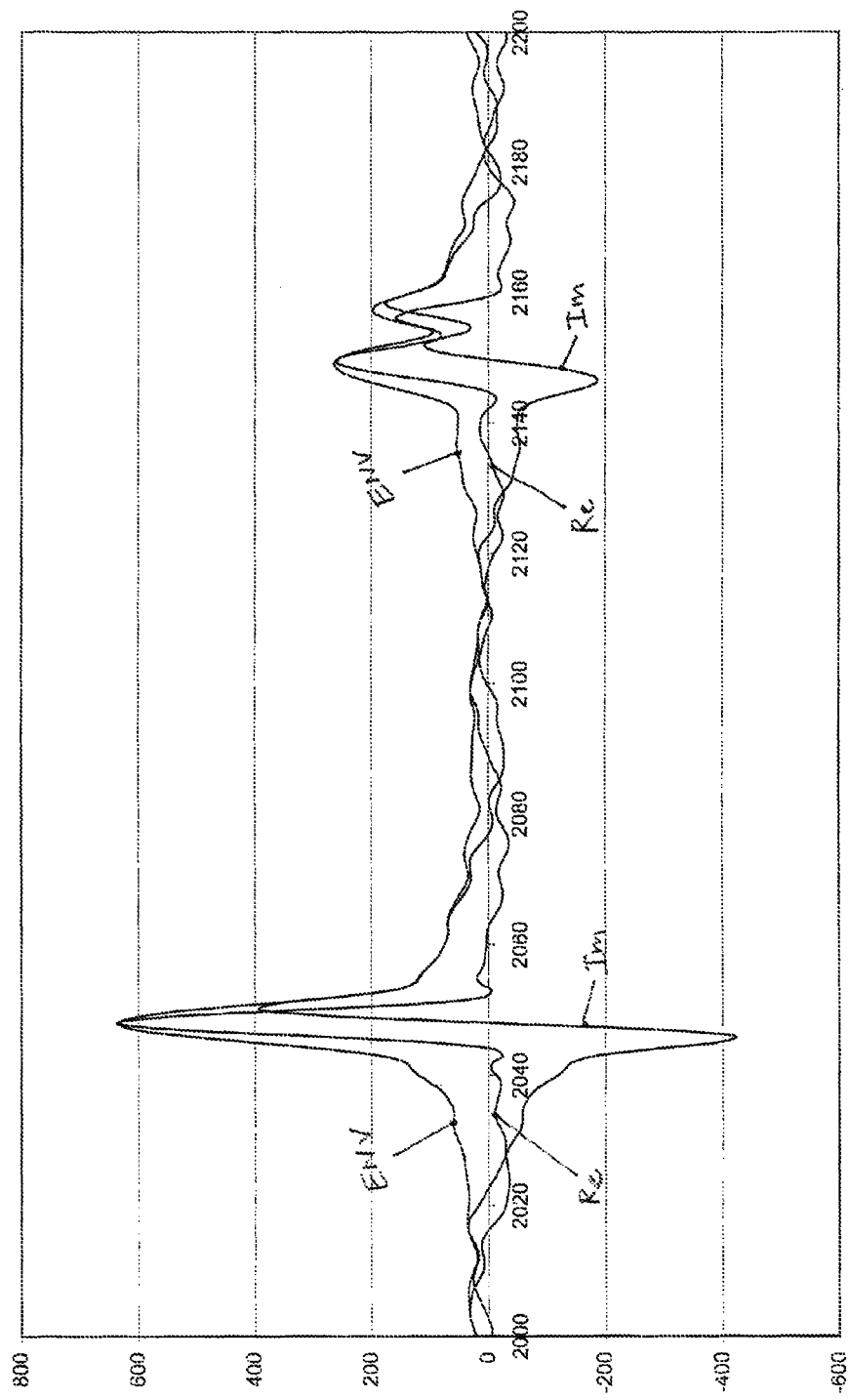
FIG. 8 is a close-up of the PN511 correlation showing three equal-amplitude zero-phase pulses approximately 110 samples behind the dominant echo.

FIG. 7 is a detailed graph of FIG. 6 showing well separated zero-phase pulses. FIG. 8 is a detailed figure of PN511 correlation with three equal-amplitude zero-phase pulses approximately 110 samples behind the dominant echo. Simple peak-finding would not be adequate for this case.

We overcome the "ill-posedness" of the problem by limiting the number of possible echoes in any interval and testing the reduction of variance for each set of delay times. The finest increment of time used is on the order of one-half of the sample interval. The greatest error that can be made in timing is then 0.25 samples, which leads to a maximum phase error of ±22.5° at half the Nyquist frequency. The number of echoes in a given time segment varies from a minimum equal to the number of distinguishable peaks in the envelope of the PN511 correlation up to an adaptable limit. The endpoint in the fitting process comes when the residual drops to the one-sigma level of the background variation. The choice of delay times to be used is not exhaustive, but is guided by the properties of the least squares problem.

The fitting problem is nonlinear because of the arbitrary and variable imposition of a limited number of echoes, and because of the nonlinearity of varying the delay times. Only the coefficients of the expansion occur linearly, and the problem is analyzed as a succession of linear least squares problems for the coefficients.

The linear subproblems have the form $$|y - Ca|^2 = \text{minimum}, \quad (29)$$

where y is a vector representing a segment or a set of segments of the observed correlation. The columns of C are segmented in time exactly the same as in y, and each column has a single zero-phase pulse (27) with a specified delay and evaluated at the same time points as are in y.

The segmentation into intervals of the time samples in y, and consequently also in the columns of C, depends on the temporal distribution of correlation peaks. Pulses that are close enough to interfere with each other (up to approximately 30 samples apart) are treated together in a single fitting problem (29). The portions to be fitted need only extend approximately ±6 samples from the envelope peak, or without a gap over regions where peaks are less than ~10 samples apart. This limits the fitting intervals to regions where the signal dominates. An interval may contain several peaks, but any single column of C has only one pulse in it, with its time samples segmented as in y.

The coefficients in vector a form a linear combination of the columns of C that minimizes the misfit in (29). Since (29) is always an overdetermined problem, the solution for a is $$a = (C^{*T}C)^{-1}C^{*T}y, \quad (30)$$

where $*^T$ denotes the adjoint (complex conjugate transpose). For pulses in C that are adequately separated in time, the inverse in (30) exists. If we substitute (30) in (29), we obtain $$|(I - C(C^{*T}C)^{-1}C^{*T})y|^2 = \text{minimum}. \quad (31)$$

If we define $$M = C(C^{*T}C)^{-1}C^{*T}, \quad (32)$$

it is apparent that MM=M. That is, M is a projection operator, so that its nonzero eigenvalues are equal to 1. Using these properties of M, we can show that $$y^{*T}My = y^{*T}C(C^{*T}C)^{-1}C^{*T}y = \text{maximum} \quad (33)$$

is equivalent to (31).

The variations performed on (33) comprise moving the pulses in C around and adding new pulses (columns) to C as well. Incorporating these changes can be done fairly methodically, since the eigenvector decomposition of the span of C is equivalently done by diagonalizing the Gram matrix $C^{*T}C$ or by simply conducting a Gram-Schmidt orthogonalization.

The Gram-Schmidt method is not in general the most desirable means of accomplishing this decomposition, but it has the great advantage of making the addition of new columns or the variation of existing columns very straightforward to analyze.

In practice, the starting number of columns in C in a multiple-peak interval would be the number of distinguishable envelope peaks. The quadratic form in (33) is maximized with respect to the delays of the pulses. The changes in the delays are determined by a step-length damped Newton-Raphson method, and the C matrices are recalculated when any delay changes by more than one-half sample. After convergence, the envelope of the residual y−Ca is then examined for detectable peaks to determine if additional peaks are to be incorporated. The linear system becomes unstable as the peaks get closer than 2 samples apart, but in practical work, the residual after fitting the contribution of two such closely spaced peaks with a single peak would not be detectable. Experience shows that the resulting equalization is still satisfactory.

Once the reduction of the variance in (29) is sufficient, or the Gram matrix is too nearly singular, the process is terminated. All independent groups of echoes are evaluated in this manner. The coefficients in the a vectors are taken to be the complex amplitudes of the echo sequence, and the delay times are retained as well. Note that none of the delay times is taken to be the zero reference time. The zero reference time always coincides with a sample time, so that the symbols will line up on-sample upon equalization.

Retrieval of Minor Echoes from the Autocorrelation

If there is only one echo detected by the PN511 correlation, then the determination of the remainder of the echo sequence is straightforward but tedious. Let the largest echo be the echo that corresponds to j=0. Then $$|E(f)|^2 = \sum_j a_j^* e^{2\pi i f \tau_j} \sum_k a_k e^{-2\pi i f \tau_k} \quad (34)$$

$$= \sum_k |a_k|^2 + \sum_k a_0^* a_k e^{-2\pi i f (\tau_k - \tau_0)} +$$

$$\sum_k a_0 a_k^* e^{-2\pi i f (\tau_0 - \tau_k)} + \sum_{k \neq j, j, k > 0} a_j^* a_k e^{-2\pi i f (\tau_j - \tau_k)}$$

The constant term transforms to the central peak of the autocorrelation at zero time. The next two sums are called the primary terms of the autocorrelation, which include a factor of the dominant echo or its conjugate. The transform of these terms will be pulses at times ±($\tau_k$−$\tau_0$) with conjugate phases at the opposite delays. The last summation contains the secondary terms, which are typically at least 10 dB down from the primary terms. Their lower amplitudes and their occurrence at the difference of the delay times of the primary terms characterize the secondary terms. Since we do not know a priori whether the delay times are positive or negative, we discriminate against peaks that occur at either the differences or the sums of the primary delay times. There is a possibility for error at this point, but experience indicates this to be a fairly effective method.

We first consider only positive delay times, since we have no basis for any other choice. The algorithm proceeds by ordering and eliminating the peaks in the autocorrelation, and thus, may be referred to herein as a "peak sieving algorithm".

1. Set a threshold for acceptance of peaks based on autocorrelation variance
2. Tabulate all peaks above threshold
3. Sort peaks by amplitude.
4. Assign complex amplitude and a positive delay to the two largest echoes
5. Difference and sum known delays, save in table
6. Reject peaks at difference or sum times as secondary
7. Accept next largest peak, assign amplitude and positive delay
8. Terminate if no more peaks
9. Loop on update of difference and sum table At this point, all primaries are determined, but may not be correctly placed in time. If there are M peaks, we test the quality of equalization of the known PN511 sequence for the $2^M$ choices of signs. Once the signs are established, it is unnecessary to re-examine them unless the channel is changed or reacquired.

The pathological case of echoes located at delays of +τ and −τ from the dominant path may cause errors.

Partial Deconvolution

Minor Echo Determination in the Presence of More than One Major Echo

If there is more than one major echo present in the received signal, the properties of the minor echoes may be determined by the following method. This method is more effective if the number of major echoes is greater than two. The idea is as follows. We express the echo spectrum E as a sum of a spectrum F and a spectrum g: E(f)=F(f)+g(f). The spectrum F includes the major echoes, and the spectrum g includes the minor echoes. Then $$E^*E = (F^* + g^*)(F + g) = |F|^2 + F^*g + Fg^* + |g|^2. \quad (35)$$

We subtract the known term $|F|^2$, and neglect the quadratic term $|g|^2$. We now approximate division by $F^*$ in a manner that avoids instabilities due to spectral minima:

$$\hat{g} = \frac{F}{|F|^2 + \varepsilon^2}(|E|^2 - |F|^2) \approx g + \frac{F^2}{|F|^2 + \varepsilon^2}g^* + O(|g|^2) \quad (36)$$

omitting a term of $O(\epsilon^2)$. This operation is a form of stabilized deconvolution that limits the effect of zeroes near or on the real frequency axis. The estimate $\hat{g}$ in (36) is transformed to the time domain for identification of the low amplitude echoes. The sparse train of pulses in the time domain representation of g stands out prominently compared to the transform of the following term, which is generally highly oscillatory and lower amplitude. As the spikes are resolved and pulse-decomposed in g, they are moved to F to improve the definition of the remaining echoes and to reduce the error from the neglected terms. The echo sequence may be refined until there is no detectable residue in g. Remarkably, the features of g are placed correctly in time, and no further processing is required.

The only caveat regarding this procedure is a possible instability when there is a high degree of symmetry in F, such as when there are only two echoes in F that have nearly equal strength and conjugate phases. The ambiguities induced by the near symmetry in F may make the identification of g more difficult.

Deconvolution

Once the echo sequence has been determined, a stabilized deconvolution is applied to remove the effects of the channel. In the frequency domain, the echo-contaminated symbols have the form E(f)s(f), where s(f) is the spectrum of the original symbols. To recover s, we approximate division by E(f) in a stabilized manner:

$$\hat{s}(f) = \frac{E^*(f)}{|E(f)|^2 + \varepsilon^2}[E(f)s(f)]. \qquad (37)$$

The stabilization term $\epsilon^2$ serves to move the poles of the deconvolution filter away from the real frequency axis. Poles cause resonant behavior with ringing persisting for a time given by the reciprocal of the width of the resonance. This width scales as the distance of the pole from the axis, hence the effect of the stabilization is to lower the Q of the resonance. By increasing $\epsilon$, we may cause the ringing of any resonance to decay sufficiently fast to prevent significant "wrap-around" in the finite time widow available for processing. Larger vales of $\epsilon$ also reduce the enhancement of additive noise that plagues deconvolution.

The increase of $\epsilon$ cannot be continued indefinitely, since the estimate in (37) tends to the convolution of the symbols with the autocorrelation of the echo sequence instead of a deconvolution. There are always echo sequences that cannot be adequately deconvolved in any given finite window.

Recursion

Recursive filtering is possible in some circumstances, most notably when a nearly 0 dB echo comes after the dominant path. For a single subsidiary echo of relative amplitude –a, the inverse echo sequence is a sequence of pulses of amplitude $a^k$ at time $k\tau$, where $\tau$ is the delay of the echo. If the amplitude does not decay to a relatively low value at the end of the finite processing window, even with the stabilization described above, then a recursive filter may be necessary. The stability of the recursive filter is assured in the case where $|a|<1$, but recursion based on more complex echo sequences is contemplated. Recursion should also work in the presence of continuous phase variations in a.

Data Normalization and Slicing

After deconvolution, the data are filtered with the root-raised-cosine filter specified in the ATSC standard. Normalization is accomplished by requiring the variance of the equalized and filtered on-sample real values (I) to be 21 (automatic variance control). Data slicing consists of assigning the nearest odd integer (from –7 to 7) to the measured value of the output.

Because of the difficulties associated with analog phase locking, it is recommended that feedback be supplied by the equalizer to change the phasing. The quantity $$u = \langle IQ \rangle \qquad (38)$$

is positive if the sampling is late and negative if early. The equalizer may provide a voltage based on (38) to apply to the local oscillator (LO) or the digital synchronous detector to correct the delay. It is possible to remove any delay at the point of deconvolution as long as the error in LO or synchronous detector frequency is small (e.g., less than 10 Hz). The bandwidth of the feedback to the oscillator should be small (e.g., less than 10 Hz) to avoid phase jitter that might derail the equalizer.

Not all parts of the equalization window are of equal quality because of the finite damping time of the inverse echo sequence. Generally, the most reliably equalized symbols occur where the inverse echo sequence has the lowest amplitudes. We partition the data window into a given number, typically 8-12, of non-overlapping subintervals and determine the maximum absolute amplitude (infinity norm) of the inverse echo sequence in each interval. The best equalization interval is the set of successive subintervals with the lowest average maximum amplitude. The computational burden of equalization is inversely proportional to the length of the subwindow in which there is an acceptable error rate, since this length limits the increment by which we may advance the processing window through the data. In difficult cases, the equalization algorithm balances two sources of errors. An insufficient amount of stabilization in (37) may cause the inverse echo sequence to wrap around in the processing window, contaminating the output symbols. If the stabilization is increased to damp the inverse echo sequence more severely, errors arise from the departure of (37) from simple deconvolution. Between these effects, it is possible that the region in which the error rate is acceptable will shrink to an unusably short interval, and equalization will fail.

Primary Data Flow Path (Indicated by Bold Arrows in FIGS. 4A-B)

The inphase (I) data from the digital output of the synchronous detector are the input to the equalizer. These data are Fourier transformed and the positive frequencies are retained. The data spectrum is subjected to stabilized deconvolution by the current echo spectrum and shaped by the root-raised-cosine filter prescribed by the ATSC standard. The deconvolved and shaped spectrum (positive frequencies only) is inverse Fourier transformed to the time domain to yield the equalized I and Q samples. The I component is required (by the ATSC standard) to satisfy the condition that the variance of its on-symbol values be 21 (in the absence of a PN sequence) for data in the current equalization interval. The average of the product of I and Q is updated to provide a uniform time-shift to the echo spectrum deconvolution and to adjust local oscillator phase or synchronous detector oscillator phase. Corrections to the oscillators are applied with low bandwidth to avoid sudden phase jitter in the input data. The data are sliced by rounding the sampled I value to the nearest odd integer between –7 and +7 inclusively. These integer values are the output of the equalizer.

Initialization and Maintenance of Training Sequence Location

When the receiver is turned on or the channel is changed, the echo sequence is unknown or may not be currently valid. Thus, a procedure is invoked to determine the echo sequence from the incoming data. The first step in this procedure is the detection of the training sequence (e.g., PN511 sequence). The spectrum of the input data is multiplied by the complex conjugate of the spectrum of the known training sequence to obtain a product spectrum (i.e., the cross-correlation spectrum). The positive frequency amplitudes in the product spectrum are retained and the negative frequency amplitudes are set to zero. The inverse Fourier transform of the product spectrum is computed to obtain the analytical signal of the cross-correlation function in the time domain. If the cross-correlation contains peaks that are sufficiently higher than the RMS variation of the cross-correlation, then the training sequence has been detected. The current field (e.g., in 8VSB transmission, a field comprising 313×832=260,416 symbols=520,832 samples at 2 samples per symbol) is then analyzed for the stability of the autocorrelation function, while the start of the data window is adjusted so that the correlation peaks in the cross-correlation occur near the middle of the window.

The schedule of jumps in the data window may be chosen to preserve the location of the correlation peaks in the cross-correlation. For example, in 8VSB transmissions, each field contains 254 blocks of 2048 samples plus 640 extra samples. It is desirable to preserve the recurrence of the training sequence and the phase of the on-symbol samples in the data window. An arrangement that satisfies both of these requirements is to use a shift of 2050 samples for 188 times, and a shift of 2052 samples for the remaining 66 times. The number of equalized symbols recovered is constrained to equal the number of symbols in each shift (1025 or 1026) to preserve the location of the symbols with respect to the optimum equalization interval in the data window.

The correlation peaks in the cross-correlation may be decomposed in terms of a basis pulse as described above to determine delays and complex amplitudes of the largest echoes.

Autocorrelation Processing

The autocorrelation spectrum may be stacked (i.e., averaged) with an exponentially fading memory as detailed in (17). In some embodiments, stacking is performed only on the real component of the power spectrum over nonnegative frequencies.

Information on the stability of the autocorrelation peak phases may be used to set the time constant for the stacking. The stability information may be obtained during the PN511 acquisition phase and continuously throughout data acquisition. The stability information may be computed by observing the time rate of change of the peak phases.

The analytical signal form of the autocorrelation in the time domain may be evaluated less frequently than the FFT of the incoming data. In some embodiments, the time constant for the stacking is used to determine the period between updates of the autocorrelation function. For example, the update period may be set equal to the stacking time constant.

The stacking time constant is a measure of the amount of time required for filter (17) to forget an input stimulus. For example, the stacking time constant may be interpreted as the value $1/(1-\alpha)$, or more generally, $B_C/(1-\alpha)$, where $B_C$ is a positive constant, where $\alpha$ is defined by equation (17).

The minor echo component of the echo sequence may be determined from the analysis of the autocorrelation function as outlined above. Once the delays are established, the amplitude and phase of all the echoes are adjusted continuously (e.g., once per $N_U$ blocks where $N_U$ equals the stacking time constant) to account for the effects of dynamic propagation paths.

Circuit Observations

The FDEA algorithm may be implemented as a set of software programs which are executable on a set of one or more computers.

In one set of embodiments, the FDEA algorithm may be computed on a single-chip integrated circuit (IC), fabricated in deep-submicron semiconductor technologies suitable for very large scale integration (VLSI). An IC architecture well suited to the FDEA is the subject of U.S. patent application Ser. No. 10/602,292, titled "Processing System With Interspersed Processors And Communication Elements", filed on Jun. 24, 2003, invented by Michael B. Doerr, William H. Hallidy, David A. Gibson, and Craig M. Chase.

In another set of embodiments, the FDEA may be computed on a set of two or more integrated circuits.

Peak Addition/Removal by Means of Partial Deconvolution

Upon startup or re-tuning, there is a potential set of echoes that have not been detected because of their low amplitudes (i.e., $|a_k|$ small). It is also expected that new echoes will arise over time because they are new to a dynamic ensemble. The following "partial deconvolution" method addresses the problem of detecting and adding low amplitude echoes (e.g., minor echoes) to the echo ensemble.

The concept of partial deconvolution starts with the supposition that the channel spectrum $E(\omega)$ is composed of a known part $K(\omega)$ of larger energy and an unknown part $U(\omega)$ of smaller energy so that $E(\omega)=K(\omega)+U(\omega)$. In other words, $K(\omega)$ may be interpreted as a sum of two or more echoes that have amplitudes $|a_k|$ that are larger than a given threshold, and $U(\omega)$ may be interpreted as the sum of echoes that have amplitudes $|a_k|$ smaller than the threshold. One statistically reliable estimate of the channel spectrum $E(\omega)$ is its power spectrum $|E(\omega)|^2$:

$$|E(\omega)|^2 = |K(\omega)|^2 + K^*(\omega)U(\omega) + K(\omega)U^*(\omega) + |U(\omega)|^2 \tag{39}$$

One procedure for estimating the unknown part $U(\omega)$ includes: (a) generating an estimate $P_E(\omega)$ for the power spectrum $|E(\omega)|^2$; (b) generating an estimate $K_e(\omega)$ for the known part $K(\omega)$; (c) computing a residual spectrum $(P_E(\omega) - |K_e(\omega)|^2)$; and (d) applying a stabilized deconvolution to the residual spectrum to obtain an estimate $V(\omega)$ of the unknown part $U(\omega)$:

$$V(\omega) = \frac{K_e(\omega)}{|K_e(\omega)|^2 + \varepsilon^2}(P_E(\omega) - |K_e(\omega)|^2). \tag{40}$$

The addition of $\varepsilon^2$ in the denominator stabilizes the deconvolution and avoids excursions to infinity where $K_e(\omega)$ equals zero.

As described above, unit 204 generates a power spectrum $P_k$ based on each window $W_k$ of the received signal samples. Averaging unit 244 filters the sequence $\{P_k\}$ of power spectra with respect to the window index k to obtain a filtered sequence $\{Q_k\}$ of power spectra. A current power spectrum $Q_k$ of the filtered sequence may be used as the estimate $P_E(\omega)$ of the power spectrum $|E(\omega)|^2$:

$$P_E(\omega) = Q_k(\omega).$$

In one embodiment, the estimate $K_e(\omega)$ for known part $K(\omega)$ may be a parametric description based on the estimated parameters $\{(a_k, \tau_k)\}$ of a set of known echoes (e.g., the major echoes as described above):

$$K_e(\omega) = \sum_k a_k \exp(-i\omega\tau_k).$$

However, it is preferable to utilize an estimate $K_e(\omega)$ that is empirical in nature, i.e., more directly based on received signal samples. In one embodiment, unit 248 of FIG. 4A computes $K_e(\omega)$ by computing a Fourier transform of a thresholded cross correlation between the training signal and the received signal. In other words, a cross correlation $R_{PY}(t)$ between the training sequence and the received signal is computed. The cross correlation $R_{PY}(t)$ is analyzed to determine peaks in $|R_{PY}(t)|$ that exceed a threshold $T_M$. (The threshold $T_M$ may be determined based on the standard deviation of the real and imaginary parts of $R_{PY}(t)$.) A modified cross correlation $M_{PY}(t)$ function is constructed by retaining the samples of $R_{PY}(t)$ residing in intervals around each of the peak times and zeroing the samples outside of those intervals. The modified cross correlation function is Fourier transformed to determine the power spectrum estimate $K_e(\omega)$:

$$K_e(\omega) = \text{DFT}(M_{TY}(t)).$$

From equations (39) and (40), it follows that:

$$V(\omega) \approx U(\omega) + \frac{K_e(\omega)^2}{|K_e(\omega)|^2 + \varepsilon^2} U(\omega)^* + O(|U(\omega)|^2). \tag{41}$$

The magnitude squared of the unknown part can be neglected since it is relatively small compared to the other terms.

The estimate $V(\omega)$ may be transformed to the time domain using an inverse Fourier transform to obtain a signal $v(t)$. The signal $v(t)$ is analyzed to determine parameters $(a_k, \tau_k)$ for one or more low amplitude echoes, e.g., using the pulse decomposition method described above.

In some embodiments, as echoes in $v(t)$ are determined, they are incorporated into the known spectrum estimate $K_e(\omega)$, e.g., according to the expression:

$$K_e(\omega) \leftarrow K_e(\omega) + \sum_k a_k \exp(-i\omega\tau_k),$$

where the summation is over the echoes determined from $v(t)$. Then $V(\omega)$ may be recomputed using equation (40). The signal $v(t)$ is recomputed from $V(\omega)$. Additional echoes may then be determined from signal $v(t)$. The additional echoes are incorporated into the known spectrum estimate $K_e(\omega)$, and so forth until there is no detectable echo in $v(t)$.

Improved Partial Deconvolution

In one set of embodiments, the partial deconvolution method computes the estimate $V(\omega)$ based on a minimization of the integral or sum of the square of the residual $$R(\omega) = P_E(\omega) - f(\omega)|K_e(\omega)|^2, \quad (42)$$

where the minimization is over a given space of functions $\{f(\omega)\}$, preferable a space of slowly varying functions of variable $\omega$. There are various options for the space of functions. For example, the function space may be the space of polynomials in $\omega$ of degree at most $N_{DEG}$. The parameter $N_{DEG}$ may take various values, e.g., values less than or equal to six. As another example, the function space may be a space of truncated Fourier series, e.g., a space given by:

$$\{A_0 + A_1 \cos(k\omega + \phi_1) + A_2 \cos(2k\omega + \phi_2) + \ldots + A_N \cos(N_F k\omega + \phi_N)\}.$$

The parameter k may be chosen so that the highest harmonic runs through at most two or three cycles over the entire range of $\omega$. A wide variety of function spaces are contemplated.

Explicitly, the estimate $V(\omega)$ for unknown part $U(\omega)$ may be computed based on the expression:

$$V(\omega) = \frac{K_e(\omega)}{|K_e(\omega)|^2 + \varepsilon^2}(P_E(\omega) - f_{MIN}(\omega)|K_e(\omega)|^2), \quad (43)$$

where $$f_{MIN} = \arg\left[\min_f \int d\omega (P_E(\omega) - f(\omega)|K_e(\omega)|^2)^2\right], \quad (44)$$

where the minimization is performed over a space of slowly varying functions as described above. The minimization may be performed using a least squares algorithm.

The signal $v(t) = DFT^{-1}(V(\omega))$ may be analyzed to determine echoes of low amplitude. In one embodiment, the partial deconvolution method applies a threshold to the absolute value signal $|v(t)|$, and determines the time locations of peaks in $|v(t)|$ that exceed the threshold. The signal $v(t)$ is then analyzed to extract the parameters $(a_k, \tau_k)$ for the echoes that correspond to those peaks. The analysis may be performed using the pulse decomposition method as described above.

In some embodiments, peaks are detected based on a signal $v_F(t)$ that is generated by fusing the signal $v(t)$ and an absolute value of the cross correlation $R_{PY}(t)$, e.g., according to the expression:

$$v_F(t) = v(t)|R_{PY}(t)|.$$

The fused indicator is generally more stable than the signal $v(t)$ alone.

In some embodiments, the signal $v(t)$ may be normalized prior to the analysis, e.g., according to the expression:

$$v_{NORM}(t) = \left(\frac{N}{\langle|E|^2\rangle}\right)^{1/2} DFT^{-1}(V(\omega)),$$

where the inverse DFT includes a factor of $1/N$, where N is the number of points in the inverse DFT. The quantity $\langle|E|^2\rangle$ is estimated by the average value of the current filtered power spectrum of the received signal (e.g., the current power spectrum $Q_k$ as discussed above) over a given frequency interval. This normalization effectively removes scale dependence.

Figure 9:
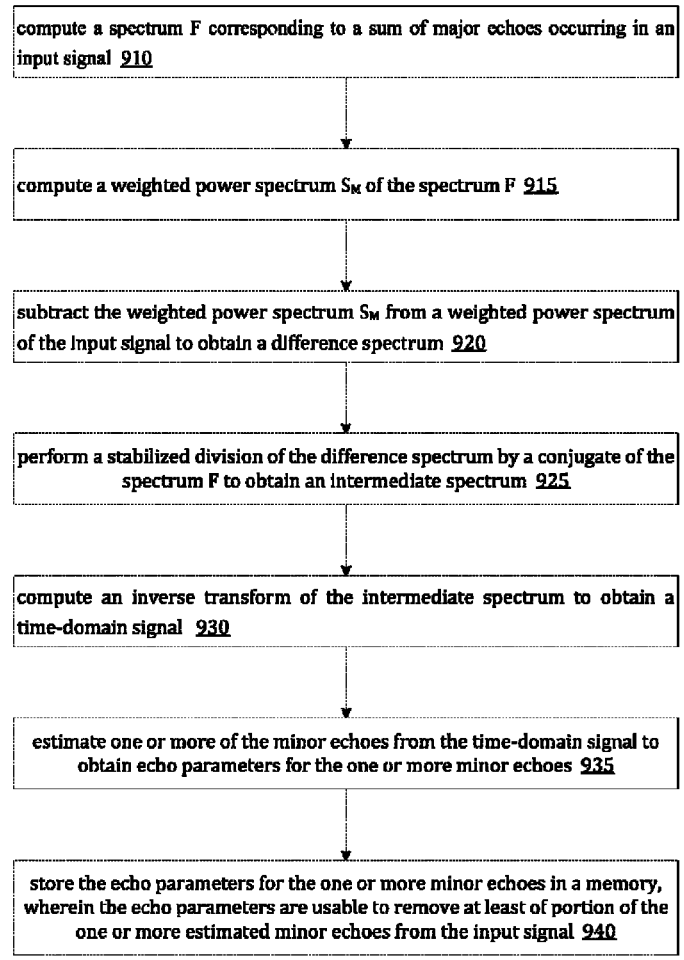
FIG. 9 illustrates one set of embodiments of a method for estimating minor echoes present in an input signal.

FIG. 9 illustrates one set of embodiments of a method for identifying minor echoes present in an input signal in the situation where two or more major echoes, also present in the input signal, have already been identified.

At 910, a processor (or a set of processors) may compute a spectrum F corresponding to a sum of the major echoes, e.g., as described variously above.

At 915, the processor may compute a weighted power spectrum $S_M$ of the spectrum F, e.g., as variously described above.

At 920, the processor may subtract the weighted power spectrum $S_M$ from a weighted power spectrum of the input signal to obtain a difference spectrum.

At 925, the processor may perform a stabilized division of the difference spectrum by a conjugate of the spectrum F to obtain an intermediate spectrum, e.g., as variously described above.

At 930, the processor may compute an inverse transform (e.g., an inverse Fourier transform) of the intermediate spectrum to obtain a time-domain signal.

At 935, the processor may estimate one or more of the minor echoes from the time-domain signal to obtain echo parameters for the one or more minor echoes, e.g., as described above in the section titled "Pulse Decomposition".

At 940, the processor may store the echo parameters for the one or more minor echoes in a memory, wherein the echo parameters are usable to remove at least a portion of the one or more estimated minor echoes from the input signal, e.g., as variously described above.

In some embodiments, the method may also include: removing the two or more major echoes and the one or more minor echoes from the input signal (e.g., as variously described above) to obtain an equalized signal; recovering information bits from the equalized signal; and providing an output signal to an output device, wherein the output signal is generated based on the information bits. Any of various well known prior art methods may be used to recover the information bits from the equalized signal. The output device may be, e.g., a display device or a speaker.

In one embodiment, the action of removing the two or more major echoes and the one or more minor echoes from the input signal includes: multiplying a spectrum of the input signal by a stabilized reciprocal of an echo spectrum to obtain an equalized spectrum (e.g., as variously described above), wherein the echo spectrum is computed (e.g., as variously described above) based on the echo parameters of at least the one or more minor echoes and echo parameters of the two or more major echoes; and transforming the equalized spectrum to the time domain to obtain the equalized signal.

In some embodiments, the method also includes: adding the one or more estimated minor echoes to the spectrum F to obtain an update of the spectrum F (e.g., as described above); and repeating operations 915 through 940 based on the update of the spectrum F in order to estimate one or more additional ones of the minor echoes (e.g., as described above).

In some embodiments, operation 915 includes: computing a power spectrum $P_F$ of the spectrum F (e.g., as described above); and multiplying the power spectrum $P_F$ by a spectral weighting function (e.g., as described above) to obtain the weighted power spectrum $S_M$. In one such embodiment, the spectral weighting function is selected from a space of functions $\{f\}$ to minimize a squared error of a residual $R(\omega)=P_{IN}(\omega)-f(\omega)P_F(\omega)$, e.g., as described above. Spectrum $P_{IN}(\omega)$ is the weighted power spectrum of the input signal.

The echo parameters may include one or more delay times of the one or more minor echoes respectively, wherein the one or more delay times are defined relative to a strongest of the major echoes, e.g., as described above. The delay times may include one or more delay times that are negative as well as one or more delay times that are positive.

Figure 10:
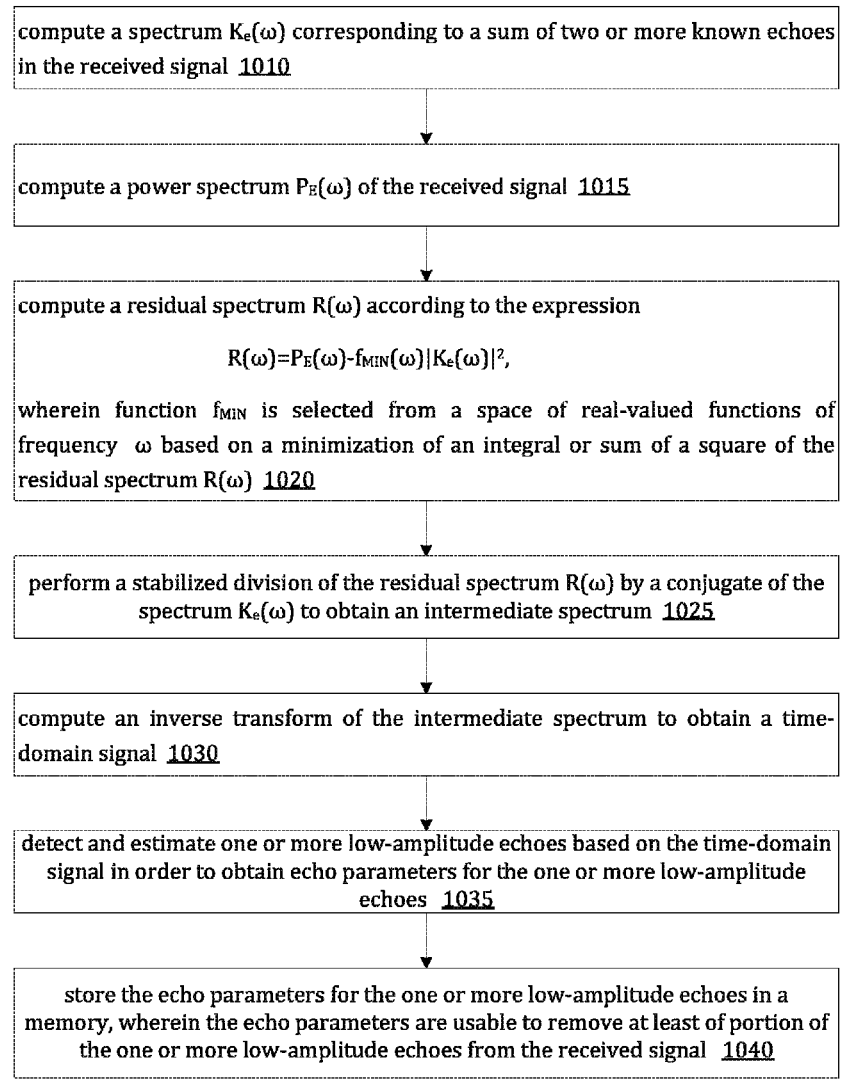
FIG. 10 illustrates one set of embodiments of a method for estimating low-amplitude echoes present in a received signal.

In one set of embodiments, a method for identifying one or more low-amplitude echoes present in a received signal may include the following operations, e.g., as illustrated in FIG. 10.

At 1010, a processor (or set of processors) may compute a spectrum $K_e(\omega)$ corresponding to a sum of two or more known echoes in the received signal, e.g., as variously described above. The known echoes may be the major echoes identified from the training signal cross correlation as variously described above. In some embodiments, the method of FIG. 10 is performed in response to determination that more than one major echo has been identified from the above-described analysis of the training signal cross correlation.

At 1015, the processor may compute a power spectrum $P_E(\omega)$ of the received signal, e.g., as variously described above.

At 1020, the processor may compute a residual spectrum $R(\omega)$ according to the expression $R(\omega)=P_E(\omega)-f_{MIN}(\omega)|K_e(\omega)|^2$, wherein function $f_{MIN}$ is selected from a space of real-valued functions of frequency $\omega$ based on a minimization of an integral or sum of a square of the residual spectrum $R(\omega)$, e.g., as variously described above.

At 1025, the processor may perform a stabilized division of the residual spectrum $R(\omega)$ by a conjugate of the spectrum $K_e(\omega)$ (e.g., as variously described above) to obtain an intermediate spectrum.

At 1030, the processor may compute an inverse transform of the intermediate spectrum to obtain a time-domain signal.

At 1035, the processor may detect and estimate one or more low-amplitude echoes (e.g., as variously described above) based on the time-domain signal in order to obtain echo parameters for the one or more low-amplitude echoes. See, e.g., the pulse decomposition method described above.

At 1040, the processor may store the echo parameters for the one or more low-amplitude echoes in a memory, wherein the echo parameters are usable to remove at least a portion of the one or more low-amplitude echoes from the received signal.

In some embodiments, the method may also include: removing the two or more known echoes and the one or more low-amplitude echoes from the received signal to obtain an equalized signal; recovering information bits from the equalized signal; and providing an output signal to an output device, wherein the output signal is generated based on the information bits. In one such embodiment, the action of removing the two or more known echoes and the one or more low-amplitude echoes from the received signal may include multiplying a spectrum of the received signal by a stabilized reciprocal of an echo spectrum to obtain an equalized spectrum, wherein the echo spectrum is computed based on the echo parameters of the one or more low-amplitude echoes and echo parameters of the two or more known echoes; and transforming the equalized spectrum to the time domain to obtain the equalized signal.

In some embodiments, the action 1010 of computing the spectrum $K_e(\omega)$ includes: computing a cross correlation signal between a training signal and the received signal; applying a threshold to a magnitude of the cross correlation signal to determine locations in time of peaks that exceed the threshold; modifying the cross correlation by zeroing samples of the cross correlation that lie outside a union of intervals positioned at the respective time locations; and transforming the modified cross correlation to the time domain to obtain the spectrum $K_e(\omega)$.

In some embodiments, the method may also include performing the minimization to determine function $f_{MIN}$.

In some embodiments, the space of real-valued functions is a space of polynomials of degree at most $N_{DEG}$, wherein $N_{DEG}$ is a non-negative integer.

In some embodiments, the action 1015 of computing the weighted power spectrum $S_M$ of the spectrum F includes: computing a power spectrum $P_k(\omega)$ based on each window $W_k$ of samples of the received signal, thereby generating a sequence $\{P_k(\omega)\}$ of power spectra; and filtering the sequence of power spectra $\{P_k(\omega)\}$ with respect to window index k to obtain a filtered sequence $\{Q_k(\omega)\}$ of power spectra, wherein the power spectrum $P_E(\omega)$ is a current power spectrum $Q_k(\omega)$ of the filtered sequence.

In some embodiments, the stabilized division of the residual spectrum $R(\omega)$ by a conjugate of the spectrum $K_e(\omega)$ conforms to the expression:

$$\frac{K_e(\omega)}{|K_e(\omega)|^2+\varepsilon^2}R(\omega),$$

wherein $\varepsilon$ is a real number.

In some embodiments, the action 1035 of detecting and estimating one or more low-amplitude echoes based on the time-domain signal includes: multiplying the time-domain signal by a cross correlation signal to obtain a product signal, wherein the cross correlation signal is a cross correlation between a training signal and the received signal; and detecting and estimating the one or more low-amplitude echoes based on the product signal in order to obtain the echo parameters for the one or more low-amplitude echoes.

In some embodiments, the action 1035 may include:

(f1) executing an iterative search to minimize a function B of the form B(y−C*A) with respect to K delay times, wherein K is a positive integer, wherein B is an increasing function of distance between y and the matrix-vector product C*A, wherein y is the time-domain signal, wherein C is a matrix with K columns, wherein the $I^{th}$ column of matrix C represents a copy of a basis pulse delayed by an $I^{th}$ one of the K delay times, wherein A represents a vector of complex coefficients;

(f2) comparing a minimized value of the function to a noise level;

(f3) increasing the order of the function B by incrementing K and repeating (f1) and (f2) if the minimized value of the function B is greater than the noise level;

(f4) storing the minimizing values of the K time delays and a corresponding value of the vector A if the minimized value of the function is less than the noise level, wherein the minimizing values of the K time delays and the corresponding value of the vector A are the echo parameters for the one or more low-amplitude echoes.

In some embodiments, the action 1035 may include:

(f1) executing an iterative search to minimize a function B of the form B(y−L) with respect to K delay times, wherein K is a positive integer, wherein B is an increasing function of distance between vector y and a linear combination L, wherein vector y is the time-domain signal, wherein the linear combination L has the form:

$$L = \sum_{I=1}^{K} C_I * A^I,$$

where vector $C_I$ represents a copy of a basis pulse delayed by an $I^{th}$ one of the K delay times, wherein $A^I$ is a complex coefficient corresponding to the $I^{th}$ one of the K delay times;

(f2) comparing a minimized value of the function to a noise level;

(f3) increasing the order of the function B by incrementing K and repeating (f1) and (f2) if the minimized value of the function is greater than the noise level;

(f4) storing the minimizing values of the K time delays and corresponding values of the complex coefficients $A^I$ if the minimized value of the function is less than the noise level, wherein the minimizing values of the K time delays and the corresponding values of the complex coefficients $A^I$ are the echo parameters for the one or more low-amplitude echoes.

Figure 11:
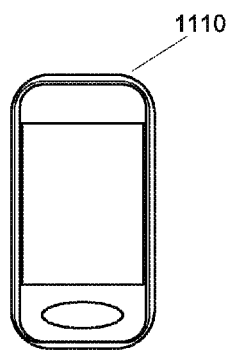
FIG. 11 illustrates an exemplary wireless device, such as a wireless telephone, which may implement embodiments of the invention.

FIG. 11 illustrates an exemplary wireless device, such as a wireless telephone, which may implement embodiments of the invention.

Figure 12:
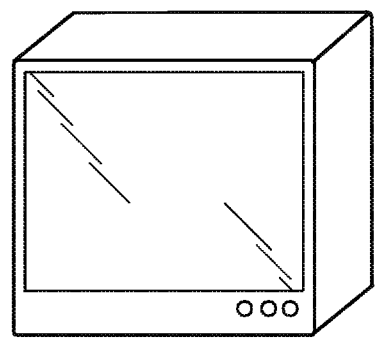
FIG. 12 illustrates an exemplary wireless device, such as a wireless television, which may implement embodiments of the invention.

FIG. 12 illustrates an exemplary wireless device, such as a wireless television, which may implement embodiments of the invention.

The following numbered paragraphs describe various additional embodiments.

1. A method for estimating a channel spectrum, the method comprising:

receiving an input signal from a channel, wherein the input signal includes one or more major echoes and one or more minor echoes, wherein the one or more major echoes and one or more minor echoes are introduced by the channel;

identifying the one or more major echoes present in the input signal;

identifying the one or more minor echoes from a filtered autocorrelation function of the input signal in response to a determination that there is only one major echo;

identifying the one or more minor echoes from a filtered power spectrum of the input signal in response to a determination that there is more than one major echo;

computing a channel spectrum estimate from the one or more major echoes and the one or more minor echoes; wherein the channel spectrum estimate is usable to remove at least a portion of the one or more major echoes and the one or more minor echoes from the input signal.

2. The method of paragraph 1, further comprising: performing a transform on the input signal to produce a spectral representation of the input signal; wherein said identifying the one or more major echoes and said operations of identifying the one or more minor echoes are performed using the spectral representation of the input signal.

3. The method of paragraph 2, wherein said filtered power spectrum is computed from the spectral representation of the input signal; wherein said filtered autocorrelation function is computed from the filtered power spectrum.

4. The method of paragraph 1, wherein said identifying the one or more major echoes comprises analyzing pulses in a signal representing a filtered cross-correlation between a training sequence and a window of the input signal.

5. The method of paragraph 1, wherein said identifying minor echoes from a filtered autocorrelation function of the input signal comprises: creating a first list of peaks, excluding a peak at zero correlation lag, in the filtered autocorrelation function; adding a peak from the first list to a second list; deleting each peak from the first list having a delay time which corresponds to any difference between or sum of delay times of peaks in the first list; repeating said adding and said deleting until the first list is empty, wherein peaks from the first list are added to the second list in order from highest peak amplitude to lowest peak amplitude.

6. The method of paragraph 1, wherein said identifying minor echoes from a filtered power spectrum of the input signal comprises: computing a power spectrum F for the major echoes; (a) subtracting the power spectrum F from the filtered power spectrum of the input signal to obtain a difference spectrum; (b) computing a stabilized division of the difference spectrum by a conjugate of the power spectrum F; (c) identifying one or more of the minor echoes from an inverse transform of the stabilized division.

7. The method of paragraph 6, further comprising: incorporating the one or more identified minor echoes into the power spectrum of F, and repeating (a), (b) and (c).

8. The method of paragraph 1, further comprising: multiplying a spectrum of the input signal by a stabilized reciprocal of the channel spectrum to determine a deconvolved spectrum; inverse transforming the deconvolved spectrum to obtain a time-domain block of samples; recovering information from the time-domain block of samples.

9. The method of paragraph 1, wherein the channel is a wireless communication channel.

10. The method of paragraph 1, wherein the channel is a wired communication channel.

11. A method for estimating a channel spectrum, comprising:

receiving an input signal from a channel, wherein the input signal includes one or more echoes introduced by the channel;

performing a transform on the input signal to produce a spectral representation of the input signal;

determining the one or more echoes based on the spectral representation of the input signal;

computing a channel spectrum estimate from the one or more echoes; wherein the channel spectrum estimate is usable to remove at least a portion of the one or more echoes from the input signal.

12. The method of paragraph 11, wherein said determining the one or more echoes comprises: determining one or more major echoes based on the spectral representation of the input signal and a spectral representation of a known training sequence; if there is only one major echo, determining the one or more minor echoes in a first manner based on the spectral representation of the signal; if there is more than one major echo, determining the one or more minor echoes in a second manner based on the spectral representation of the signal.

13. The method of paragraph 12, wherein said determining the one or more minor echoes in a first manner comprises determining the one or more minor echoes using a filtered autocorrelation function of the input signal; wherein said determining the one or more minor echoes in a second manner comprises determining the one or more minor echoes using a filtered power spectrum of the input signal.

14. The method of paragraph 12, wherein said determining the one or more minor echoes in a first manner comprises:
computing a filtered autocorrelation function of the input signal from the spectral representation of the input signal;
creating a first list of peaks, excluding a peak at zero correlation lag, in the filtered autocorrelation;
adding a peak from the first list to a second list;
deleting each peak from the first list having a delay time which corresponds to any difference between or sum of delay times of peaks in the first list;
repeating said adding and said deleting until the first list is empty, wherein peaks from the first list are added to the second list in order from highest peak amplitude to lowest peak amplitude.

15. The method of paragraph 12, wherein said determining the one or more minor echoes in a second manner comprises: computing a power spectrum F for the major echoes; (a) subtracting the power spectrum F from a filtered power spectrum of the input signal to obtain a difference spectrum; (b) computing a stabilized division of the difference spectrum by a conjugate of the power spectrum F; (c) identifying one or more of the minor echoes from an inverse transform of the stabilized division.

16. The method of paragraph 11, further comprising: adjusting the input signal to remove at least a portion of the one or more echoes from the input signal based on the channel spectrum estimate.

17. The method of paragraph 11, wherein the input signal is a digital television signal.

18. A method for estimating a channel spectrum, comprising:
performing a transform on a signal to produce a spectral representation of the signal;
computing a cross-correlation spectrum by multiplication of the spectral representation of the signal and a spectral representation of a training signal;
performing an inverse transform on the cross-correlation spectrum to produce a time-domain cross-correlation function;
computing a first amplitude envelope of the cross-correlation function;
estimating locations of first peaks in the first amplitude envelope that exceed a first amplitude threshold;
identifying a first set of major echoes corresponding to the first peak locations from the cross-correlation function;
identifying a reference echo among the first set of major echoes;
if there is only one major echo, then determining minor echoes from a filtered autocorrelation function;
if there is more than one major echo, then determining minor echoes from a filtered power spectrum;
computing a channel spectrum estimate from the major echoes and minor echoes; wherein the channel spectrum estimate is usable to approximate an original transmission to permit recovery of information from the signal.

19. A method comprising:
(a) computing a first amplitude envelope of a cross-correlation function;
(b) estimating locations of first peaks in the first amplitude envelope that exceed a first amplitude threshold;
(c) identifying from the cross-correlation function a first set of major echoes corresponding to the first peak locations;
(d) identifying a reference echo among the first set of major echoes;
(e) executing a first algorithm to determine minor echoes from a filtered autocorrelation function in response to a determination that there is only one major echo;
(f) executing a second algorithm to determine the minor echoes from a first filtered power spectrum in response to a determination that there is more than one major echo;
(g) computing a channel spectrum estimate from the major echoes and minor echoes; wherein the channel spectrum estimate is usable to compute an estimate of an original transmission to permit recovery of information from an input signal.

20. The method of paragraph 19, wherein the first amplitude threshold depends on an estimate of a standard deviation of the cross-correlation function in the absence of peaks.

21. The method of paragraph 19, further comprising: establishing the nearest sample time to the reference echo as the zero-delay reference time for definition of the echo delays.

22. The method of paragraph 19, wherein the reference echo is an echo having a maximal amplitude among the first set of major echoes.

23. The method of paragraph 19, wherein execution of the first algorithm includes:
computing a second amplitude envelope of the filtered autocorrelation function;
generating a first list of peaks in the second amplitude envelope, excluding a peak at zero delay, that exceed a second amplitude threshold;
determining the number $N_P$ of peaks in the first list;
sorting the first list according to peak amplitude;
performing a first procedure in response to a determination that the number $N_P$ is greater than or equal to three, wherein the first procedure includes: (e1) accessing two peaks of largest amplitude from the first list; (e2) removing the accessed peaks from the first list, and adding delay times and complex amplitudes corresponding to the accessed peaks to a second list; (e3) computing a table T of differences between pairs of delay times in the second list, and computing a table S of sums of pairs of delay times in the second list; (e4) deleting from the first list any peaks whose delay times correspond to at least one of the generated sums in table S or at least one of the differences in table T; (e5) accessing a next peak of largest amplitude from the first list, and repeating (e2) through (e4) in response to a determination that the first list is nonempty;
resolving sign ambiguity of delay times in said second list to determine delay times and corresponding complex coefficients of the minor echoes.

24. The method of paragraph 23 further comprising performing a second procedure in response to a determination that the number $N_P$ is equal to one, wherein the second procedure includes: adding to the second list the delay time and complex amplitude corresponding to the single peak from the first list.

25. The method of paragraph 23 further comprising performing a third procedure in response to a determination that the number $N_P$ is equal to two, wherein the third procedure includes: adding to the second list the delay times and complex amplitudes corresponding to the two peaks from the first list.

26. The method of paragraph 23, wherein the differences between pairs of delay times in the second list are positive differences.

27. The method of paragraph 23, wherein the differences between pairs of delay times in the second list are negative differences.

28. The method of paragraph 23, wherein (e4) comprises deleting from the first list any peaks whose delay times correspond within one sample to at least one of the generated sums in table S or at least one of the differences in table T.

29. The method of paragraph 23, wherein said resolving signs comprises:

(e6) generating a vector X of the form $(X_1, X_2, \ldots, X_M)$, wherein M is the number of delay times in the second list, wherein each value $X_J$ equals zero or one;

(e7) computing an echo spectrum estimate according to the expression T=UV, where $$U = |A_0| + \sum_{J=1}^{M} (\text{Re}(A_J) + (-1)^{X_J} i\text{Im}(A_J)) \exp(2\pi i f d_J (-1)^{X_J}),$$

and $$V = \exp(2\pi i f d_0) \exp(i \text{Arg}(A_0)),$$

wherein $A_J$ is the complex coefficient associated with the $J^{th}$ echo in the second list,
wherein $A_0$ is the complex coefficient associated with the reference echo,
wherein $d_J$ is the delay time associated with the $J^{th}$ echo in the second list; wherein f is a discrete frequency index,
wherein $d_0$ is the delay time associated with the reference echo;

(e8) performing a stabilized division of the spectrum of a block B of samples of the input signal by the echo spectrum estimate to obtain an deconvolved signal spectrum, wherein the block B contains a known training sequence;

(e9) inverse transforming the deconvolved spectrum to obtain a deconvolved signal;

(e10) processing the deconvolved signal to decode a sequence of symbols;

(e11) comparing the sequence of decoded symbols with the known training sequence to determine an error;

repeating (e6) through (e11) for each of the $2^M$ states of said vector X;

selecting the echo spectrum estimate corresponding to the state X which minimizes said error as a final echo spectrum estimate.

30. The method of paragraph 19, wherein execution of the second algorithm includes:

(f1) computing a massive spectrum corresponding to a sum of the major echoes;

(f2) computing a filtered power spectrum $S_M$ of the massive spectrum;

(f3) subtracting the filtered power spectrum $S_M$ from the first filtered power spectrum to obtain a difference spectrum;

(f4) performing a stabilized division of the difference spectrum by a conjugate of the massive spectrum to obtain an intermediate spectrum;

(f5) computing an inverse transform of the intermediate spectrum to obtain a time-domain signal;

(f6) identifying peaks of sufficient amplitude in an amplitude envelope of the time-domain signal;

(f7) estimating one or more echoes from the identified peaks and the time-domain signal;

(f8) adding the one or more echoes to a list of the minor echoes;

(f9) adding the one or more echoes to the massive spectrum;

(f10) repeating (f2) through (f9) until a termination condition is achieved.

31. The method of paragraph 30, wherein the termination condition is a condition that the amplitude envelope of the time-domain signal contains no peaks of sufficient amplitude.

32. The method of paragraph 30, wherein (f2) comprises: computing a power spectrum $P_M$ of the massive spectrum; and multiplying the power spectrum $P_M$ of the massive spectrum by a spectral weighting function which takes non-zero values only over non-negative frequencies.

33. The method of paragraph 19 wherein (c) includes:

(c1) executing an iterative search to minimize a function of the form f(y−C*A) with respect to K delay times, wherein K is a positive integer, wherein f is an increasing function of distance between y and the matrix-vector product C*A, wherein y is the filtered autocorrelation function, wherein C is a matrix with K columns, wherein the $I^{th}$ column of matrix C represents a copy of a basis pulse delayed by an $I^{th}$ one of the K delay times; wherein A represents a vector of complex coefficients;

(c2) comparing a minimized value of the function to a noise level;

(c3) increasing the order of the function by incrementing K and repeating (c1) and (c2) if the minimized value of the function is greater than the noise level;

(c4) storing the minimizing values of the K time delays and a corresponding value of the vector A if the minimized value of the function is less than the noise level.

34. The method of paragraph 19, wherein (c) includes:

(c1) executing an iterative search to minimize a function of the form f(y−L) with respect to K delay times, wherein K is a positive integer, wherein f is an increasing function of distance between vector y and a linear combination L, wherein vector y is the filtered autocorrelation function, wherein the linear combination L has the form $$\sum_{I=1}^{K} C_I * A^I,$$

where vector $C_I$ represents a copy of a basis pulse delayed by an $I^{th}$ one of the K delay times, wherein $A^I$ is a complex coefficient corresponding to the $I^{th}$ one of the K delay times;

(c2) comparing a minimized value of the function to a noise level;

(c3) increasing the order of the function by incrementing K and repeating (e1) and (c2) if the minimized value of the function is greater than the noise level;

(c4) storing the minimizing values of the K time delays and a corresponding values of the complex coefficients $A^I$ if the minimized value of the function is less than the noise level.

35. The method of paragraph 19, wherein the cross-correction function represents a cross-correlation between a known training signal and a block of samples of the input signal.

36. The method of paragraph 19, further comprising:

averaging a first stream of power spectra of the input signal to obtain a second stream of averaged power spectra;

multiplying each averaged power spectrum of the second stream by a spectral weighting function defined over positive frequencies to obtain a third stream of filtered power spectra of the input signal;

wherein said first filtered power spectrum is a current one of the filtered power spectra in the third stream;

wherein the filtered autocorrelation function results from an inverse transform of the first filtered power spectrum.

37. The method of paragraph 36, wherein the weighting function is a non-negative real symmetric spectrum whose decay at high frequencies is such that the amplitude envelope of the corresponding analytic signal in the time domain has a single maximum.

38. A method comprising:
(a) receiving a first stream of blocks of samples of an input signal;
(b) computing a transform of each block of samples to generate a second stream of signal spectra;
(c) performing a frequency-domain autocorrelation operation on each signal spectrum of the second stream to obtain a third stream of power spectra;
(d) filtering the third stream of power spectra to obtain a fourth stream of filtered power spectra;
(e) computing an analytic signal $S_A$ by performing an inverse transform of a current one of the fourth stream of filtered power spectra over non-negative frequencies;
(f) estimating complex coefficients for a set of echoes from an analysis of pulses in selected intervals of the analytic signal $S_A$, given a current estimate of delay times for the set of echoes;
(g) generating a revised channel spectrum estimate from phase changes of the estimated complex coefficients and the current estimate of the delay times;
(h) repeating (e), (f), and (g);
(i) updating the set of echoes including delay times in response to an update condition.

39. The method of paragraph 38, wherein the update condition is a condition indicating that one or more of the delay times of the set of echoes have detectably changed since a last update.

40. The method of paragraph 38, wherein said repeating comprises repeating (e), (f) and (g) at a rate determined by a largest time rate of change of the phases of the estimated complex coefficients.

41. The method of paragraph 38, wherein said analysis of pulses in an interval X of said selected intervals comprises computing an estimate A for a vector of the form $$(C^{*T}C)^{-1}C^{*T}y,$$

wherein y is the analytic signal $S_A$, wherein each column of matrix C is a copy of a basis pulse shifted in time by an amount equal to the current estimate of delay time, of an echo in said set of echoes, occurring in the interval X, wherein components of the vector A are the estimates of the complex coefficients of the echoes occurring in the interval X.

42. The method of paragraph 38 wherein the selected intervals are intervals containing pulses of sufficient amplitude in the amplitude envelope of analytic signal $S_A$.

43. The method of paragraph 38, wherein said filtering comprises performing an IIR filtration on the third stream of power spectra to obtain the fourth stream of filtered power spectra.

44. The method of paragraph 43, wherein a recursion coefficient α of the IIR filtration is determined by said largest time rate of change of the phases of the estimated complex coefficients.

45. A method for estimating a channel spectrum, the method comprising:
averaging a first stream of power spectra of an input signal to generate a second stream of averaged power spectra;
filtering a selected one of the averaged power spectra in the second stream to obtain a filtered power spectrum;
computing an inverse transform on the filtered power spectrum to obtain an autocorrelation signal;
analyzing peaks in the autocorrelation signal to determine a significant subset of the peaks;
computing echo delay times and echo coefficients from the significant subset of the peaks; computing a channel spectrum estimate from the echo delay times and echo coefficients;
wherein the channel spectrum estimate is usable to compute an estimate of an original transmission to permit recovery of information from the input signal.

46. The method of paragraph 45 further comprising:
performing a frequency-domain deconvolution operation on one or more signal spectra of the input signal using the channel spectrum estimate to obtain one or more corresponding deconvolved spectra;
computing an inverse transform of each of the deconvolved spectra to obtain deconvolved blocks of samples; and
recovering information from the deconvolved blocks of samples.

47. The method of paragraph 46, wherein the frequency-domain deconvolution is a stabilized deconvolution.

48. The method of paragraph 45, wherein said averaging comprises averaging with an IIR filter, such that the effect of past contributions to the average decays exponentially with time.

49. A signal receiver system, comprising:
a memory configured to store program instructions; and
a processor configured to read and execute program instructions from the memory, wherein, in response to execution of said program instructions, the processor is operable to: receive an input signal from a channel, wherein the input signal includes one or more major echoes and one or more minor echoes, wherein the one or more major echoes and one or more minor echoes are introduced by the channel; identify the one or more major echoes present in the input signal; identify the one or more minor echoes from a filtered autocorrelation function of the input signal in response to a determination that there is only one major echo; identify the one or more minor echoes from a filtered power spectrum of the input signal in response to a determination that there is more than one major echo; and compute a channel spectrum estimate from the one or more major echoes and the one or more minor echoes; wherein the channel spectrum estimate is usable to remove at least a portion of the one or more major echoes and the one or more minor echoes from the input signal.

50. A signal receiver system, comprising:
an input for receiving an input signal from a channel, wherein the input signal includes one or more major echoes and one or more minor echoes, wherein the one or more major echoes and one or more minor echoes are introduced by the channel;
means for identifying the one or more major echoes present in the input signal;
means for identifying the one or more minor echoes from a filtered autocorrelation function of the input signal in response to a determination that there is only one major echo;
means for identifying the one or more minor echoes from a filtered power spectrum of the input signal in response to a determination that there is more than one major echo;
means for computing a channel spectrum estimate from the one or more major echoes and the one or more minor echoes;
wherein the channel spectrum estimate is usable to remove at least a portion of the one or more major echoes and the one or more minor echoes from the input signal.

51. A memory medium comprising program instructions for estimating a channel spectrum, wherein the program instructions are executable to implement:

receiving an input signal from a channel, wherein the input signal includes one or more major echoes and one or more minor echoes, wherein the one or more major echoes and one or more minor echoes are introduced by the channel;

identifying the one or more major echoes present in the input signal;

identifying the one or more minor echoes from a filtered autocorrelation function of the input signal in response to a determination that there is only one major echo;

identifying the one or more minor echoes from a filtered power spectrum of the input signal in response to a determination that there is more than one major echo;

computing a channel spectrum estimate from the one or more major echoes and the one or more minor echoes; wherein the channel spectrum estimate is usable to remove at least a portion of the one or more major echoes and the one or more minor echoes from the input signal.

52. A method for determining a set of minor echoes from an input signal, the method comprising:

receiving the input signal;

determining that there is more than one major echo in the input signal;

(a) computing a spectrum F corresponding to a sum of the major echoes;

(b) computing a filtered power spectrum $S_M$ of the spectrum F;

(c) subtracting the filtered power spectrum $S_M$ from a filtered power spectrum of the input signal to obtain a difference spectrum;

(d) performing a stabilized division of the difference spectrum by a conjugate of the spectrum F to obtain an intermediate spectrum;

(e) computing an inverse transform of the intermediate spectrum to obtain a time-domain signal;

(f) estimating one or more of the minor echoes from the time-domain signal;

(g) adding the one or more estimated echoes to the spectrum F.

53. The method of paragraph 52, further comprising: repeating (b) through (g) until a termination condition is achieved.

54. A method for determining minor echoes from an input signal, the method comprising:

receiving the input signal;

determining that there is only one major echo in the input signal;

computing an amplitude envelope of a filtered autocorrelation function of the input signal;

generating a first list of peaks in the amplitude envelope, excluding a peak at zero delay, that exceed an amplitude threshold;

determining the number $N_P$ of peaks in the first list;

performing a first procedure in response to a determination that the number $N_P$ is greater than or equal to three, wherein the first procedure includes: (a) accessing two peaks of largest amplitude from the first list; (b) removing the accessed peaks from the first list, and adding delay times and complex amplitudes corresponding to the accessed peaks to a second list; (c) computing a table T of differences between pairs of delay times in the second list, and computing a table S of sums of pairs of delay times of the accepted peaks; (d) deleting from the first list any peaks whose delay times correspond to at least one of the generated sums in table S or at least one of the differences in table T; (e) accessing a next peak of largest amplitude from the first list, and repeating (b) through (d), in response to a determination that the first list is nonempty.

55. The method of paragraph 54, further comprising: resolving sign ambiguity of time delays in said second list to determine time delays and corresponding complex coefficients of the minor echoes.

56. The method of paragraph 54 further comprising: sorting the first list according to peak amplitude prior to said performing the first procedure.

Although the present invention has been described in connection with various sets of embodiments, it is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A non-transitory memory medium for identifying minor echoes present in an input signal in the situation where two or more major echoes, also present in the input signal, have already been identified, wherein the memory medium stores program instructions, wherein the program instructions, when executed by one or more processors, cause the one or more processors to:

(a) compute a weighted power spectrum $S_M$ of a spectrum F, wherein the spectrum F corresponds to a sum of the major echoes;

(b) subtract the weighted power spectrum $S_M$ from a weighted power spectrum of the input signal to obtain a difference spectrum;

(c) determine an intermediate spectrum based at least in part on the difference spectrum and the spectrum F; and (d) estimate one or more of the minor echoes from a time-domain signal to obtain echo parameters for the one or more minor echoes, wherein the time-domain signal is determined based on the intermediate spectrum.

2. The non-transitory memory medium of claim 1, wherein the program instructions, when executed by one or more processors, further cause the one or more processors to:

remove the two or more major echoes and the one or more minor echoes from the input signal to obtain an equalized signal;

recover information bits from the equalized signal; and provide an output signal to an output device, wherein the output signal is generated based on the information bits.

3. The non-transitory memory medium of claim 2, wherein said removing includes:

multiplying a spectrum of the input signal by a stabilized reciprocal of an echo spectrum to obtain an equalized spectrum, wherein the echo spectrum is computed based on the echo parameters of at least the one or more minor echoes and echo parameters of the two or more major echoes; and transforming the equalized spectrum to the time domain to obtain the equalized signal.

4. The non-transitory memory medium of claim 1, wherein the program instructions, when executed by one or more processors, further cause the one or more processors to:

add the one or more estimated minor echoes to the spectrum F to obtain an update of the spectrum F; and repeat (a) through (d) based on the update of the spectrum F in order to estimate one or more additional ones of the minor echoes.

5. The non-transitory memory medium of claim 1, wherein (a) comprises:

computing a power spectrum $P_F$ of the spectrum F; and multiplying the power spectrum $P_F$ by a spectral weighting function to obtain the weighted power spectrum $S_M$.

6. The non-transitory memory medium of claim 5, wherein the spectral weighting function is selected from a space of functions {f} to minimize a squared error of a residual $R(\omega)=P_{IN}(\omega)-f(\omega)P_F(\omega)$, wherein $P_{IN}(\omega)$ is the weighted power spectrum of the input signal.

7. The non-transitory memory medium of claim 1, wherein the echo parameters include one or more delay times of the one or more minor echoes respectively, wherein the one or more delay times are defined relative to a strongest of the major echoes, wherein at least one of the one or more delay times is negative.

8. The non-transitory memory medium of claim 1, wherein the program instructions, when executed by one or more processors, further cause the one or more processors to:
(e) store the echo parameters for the one or more minor echoes in a memory, wherein the echo parameters are usable to remove at least a portion of the one or more estimated minor echoes from the input signal.

9. A non-transitory memory medium for identifying one or more low-amplitude echoes present in a received signal, wherein the memory medium stores program instructions, wherein the program instructions, when executed by one or more processors, cause the one or more processors to:
(a) compute a residual spectrum $R(\omega)$ according to the expression $$R(\omega)=P_E(\omega)-f_{MIN}(\omega)|K_e(\omega)|^2,$$

wherein $K_e(\omega)$ is a spectrum corresponding to a sum of two or more known echoes in the received signal, wherein $P_E(\omega)$ is a power spectrum of the received signal, wherein function $f_{MIN}$ is selected from a space of functions of frequency $\omega$ based on a minimization of an integral or a sum of a square of the residual spectrum $R(\omega)$;

(b) determine an intermediate spectrum based at least in part on the residual spectrum $R(\omega)$ and the spectrum $K_e(\omega)$; and (c) detect and estimate one or more low-amplitude echoes based on a time-domain signal in order to obtain echo parameters for the one or more low-amplitude echoes, wherein the time-domain signal is based on the intermediate spectrum.

10. The non-transitory memory medium of claim 9, wherein the program instructions, when executed by one or more processors, further cause the one or more processors to:
remove the two or more known echoes and the one or more low-amplitude echoes from the received signal to obtain an equalized signal;
recover information bits from the equalized signal; and
provide an output signal to an output device, wherein the output signal is generated based on the information bits.

11. The non-transitory memory medium of claim 10, wherein said removing includes:
multiplying a spectrum of the received signal by a stabilized reciprocal of an echo spectrum to obtain an equalized spectrum, wherein the echo spectrum is computed based on the echo parameters of the one or more low-amplitude echoes and echo parameters of the two or more known echoes; and
transforming the equalized spectrum to the time domain to obtain the equalized signal.

12. The non-transitory memory medium of claim 9, wherein the spectrum $K_e(\omega)$ is determined by:

computing a cross correlation signal between a training signal and the received signal;
applying a threshold to a magnitude of the cross correlation signal to determine locations in time of peaks that exceed the threshold;
modifying the cross correlation signal by zeroing samples of the cross correlation signal that lie outside a union of intervals positioned at the respective time locations; and
transforming the modified cross correlation signal to the time domain to obtain the spectrum $K_e(\omega)$.

13. The non-transitory memory medium of claim 9, wherein the program instructions, when executed by one or more processors, further cause the one or more processors to:
perform the minimization to determine function $f_{MIN}$.

14. The non-transitory memory medium of claim 9, wherein the space of functions is a space of slowly varying functions.

15. The non-transitory memory medium of claim 9, wherein the power spectrum $P_E(\omega)$ is determined by:
computing a power spectrum $P_k(\omega)$ based on each window $W_k$ of samples of the received signal, thereby generating a sequence $\{P_k(\omega)\}$ of power spectra; and
filtering the sequence of power spectra $\{P_k(\omega)\}$ with respect to window index k to obtain a filtered sequence $\{Q_k(\omega)\}$ of power spectra, wherein the power spectrum $P_E(\omega)$ is a current power spectrum $Q_k(\omega)$ of the filtered sequence.

16. The non-transitory memory medium of claim 9, wherein said determining the intermediate spectrum includes performing a stabilized division of the residual spectrum $R(\omega)$ by a conjugate of the spectrum $K_e(\omega)$, wherein the stabilized division conforms to the expression:

$$\frac{K_e(\omega)}{|K_e(\omega)|^2+\varepsilon^2}R(\omega),$$

wherein $\epsilon$ is a real number.

17. The non-transitory memory medium of claim 9, wherein (c) includes:
multiplying the time-domain signal by a cross correlation signal to obtain a product signal, wherein the cross correlation signal is a cross correlation between a training signal and the received signal; and
detecting and estimating the one or more low-amplitude echoes based on the product signal in order to obtain the echo parameters for the one or more low-amplitude echoes.

18. The non-transitory memory medium of claim 9, wherein (c) includes:
(c1) executing an iterative search to minimize a function B of the form B(y−C*A) with respect to K delay times, wherein K is a positive integer, wherein B is an increasing function of distance between y and the matrix-vector product C*A, wherein y is the time-domain signal, wherein C is a matrix with K columns, wherein the $I^{th}$ column of matrix C represents a copy of a basis pulse delayed by an $I^{th}$ one of the K delay times, wherein A represents a vector of complex coefficients;
(c2) comparing a minimized value of the function B to a noise level;
(c3) increasing the order of the function B by incrementing K and repeating (c1) and (c2) if the minimized value of the function B is greater than the noise level;
(c4) storing the minimizing values of the K time delays and a corresponding value of the vector A if the minimized value of the function B is less than the noise level, wherein the minimizing values of the K time delays and the corresponding value of the vector A are the echo parameters for the one or more low-amplitude echoes.

19. The non-transitory memory medium of claim 9, wherein (c) includes:
(c1) executing an iterative search to minimize a function B of the form B(y−L) with respect to K delay times, wherein K is a positive integer, wherein B is an increasing function of distance between vector y and a linear combination L, wherein vector y is the time-domain signal, wherein the linear combination L has the form:

$$L = \sum_{I=1}^{K} C_I * A^I,$$

wherein vector $C_I$ represents a copy of a basis pulse delayed by an $I^{th}$ one of the K delay times, wherein $A^I$ is a complex coefficient corresponding to the $I^{th}$ one of the K delay times;

(c2) comparing a minimized value of the function B to a noise level;
(c3) increasing the order of the function B by incrementing K and repeating (c1) and (c2) if the minimized value of the function B is greater than the noise level;
(c4) storing the minimizing values of the K time delays and corresponding values of the complex coefficients $A^I$ if the minimized value of the function B is less than the noise level,
wherein the minimizing values of the K time delays and the corresponding values of the complex coefficients $A^I$ are the echo parameters for the one or more low-amplitude echoes.

20. The non-transitory memory medium of claim 9, wherein the program instructions, when executed by one or more processors, further cause the one or more processors to:
(d) store the echo parameters for the one or more low-amplitude echoes in a memory, wherein the echo parameters are usable to remove at least a portion of the one or more low-amplitude echoes from the received signal.

\* \* \* \* \*